United States Patent
White et al.

(10) Patent No.: US 10,579,245 B1
(45) Date of Patent: Mar. 3, 2020

(54) APPARATUSES AND METHODS FOR GRAPHICAL USER INTERFACE DISPLAY TO INCREASE COMPLETENESS AND ACCURACY OF MEASURED PARAMETER VALUES FOR INSTALLATION OF GARAGE DOORS

(71) Applicant: Mid-Atlantic Door Group, Inc., Beltsville, MD (US)

(72) Inventors: Justin White, Clarksville, MD (US); Andrew Woods, Towson, MD (US)

(73) Assignee: Mid-Atlantic Door Group, Inc., Beltsville, MD (US)

( * ) Notice: Subject to any disclaimer, the term of this patent is extended or adjusted under 35 U.S.C. 154(b) by 0 days.

(21) Appl. No.: 16/137,727

(22) Filed: Sep. 21, 2018

(51) Int. Cl.
  *G06F 17/00* (2019.01)
  *G06F 3/0484* (2013.01)
  *G06F 17/50* (2006.01)
  *G06F 3/0482* (2013.01)

(52) U.S. Cl.
  CPC ........ *G06F 3/04847* (2013.01); *G06F 3/0482* (2013.01); *G06F 17/5004* (2013.01)

(58) Field of Classification Search
  CPC .............. G06F 17/30; G06F 17/5004; G06F 17/04847; G06F 3/0484; G06Q 30/06
  USPC .......................................... 715/701, 731, 762
  See application file for complete search history.

(56) References Cited

U.S. PATENT DOCUMENTS

| | | | |
|---|---|---|---|
| 6,999,907 B2 * | 2/2006 | Smith | G06F 17/5004 703/1 |
| 7,019,759 B1 * | 3/2006 | Moore | G06Q 30/0621 345/418 |
| 7,747,483 B1 * | 6/2010 | Puerini | G06Q 10/04 705/29 |
| 9,213,785 B2 | 12/2015 | Plewe | |
| 10,095,754 B1 * | 10/2018 | DiBenedetto | G06Q 30/0625 |

(Continued)

OTHER PUBLICATIONS

AEC Estimating Tools, Estimating software taps into CAD building model data, Sep. 2002, www.cadalyst.com/aec/aec-estimating-tools-2454 (Year: 2002).*

(Continued)

*Primary Examiner* — Stephen S Hong
*Assistant Examiner* — Matthew J Ludwig
(74) *Attorney, Agent, or Firm* — Dickinson Wright PLLC

(57) ABSTRACT

A technical solution provides a graphical user interface display that increases completeness and accuracy of determining values for installation parameters needed to install one or more garage doors and related equipment in different garage door (GD) installation environments where different types of GD installations use different combinations of installation parameters. Displays of different GD installation environments (e.g., single or multiple doors) with and without obstructions are generated using a graphical user interface with different parameter indicators generated in sequence according to GD installation type to determine values of GD installation parameters needed to improve accuracy of GD installation designs. The different parameter indicators are generated dynamically to illustrate the respective GD installation parameters such as opening dimensions, head room, side room on sides of an GD opening, shared side room between adjacent GD openings, as well as GD installation parameters impacted by obstructions in the GD installation environment.

18 Claims, 37 Drawing Sheets

(56) References Cited

U.S. PATENT DOCUMENTS

| | | | |
|---|---|---|---|
| 10,395,435 B2* | 8/2019 | Powers | G06T 15/10 |
| 2001/0047251 A1* | 11/2001 | Kemp | G06F 17/5004 |
| | | | 703/1 |
| 2002/0010522 A1* | 1/2002 | Martin | G06F 17/5004 |
| | | | 700/97 |
| 2006/0217941 A1* | 9/2006 | Soteros | G06F 17/5004 |
| | | | 703/1 |
| 2007/0171223 A1* | 7/2007 | McArdle | G06T 19/00 |
| | | | 345/420 |
| 2007/0174027 A1* | 7/2007 | Moiseyev | G06F 17/5004 |
| | | | 703/1 |
| 2009/0160856 A1* | 6/2009 | Hoguet | G06Q 10/06 |
| | | | 345/420 |
| 2012/0278047 A1* | 11/2012 | Hoguet | G06Q 30/00 |
| | | | 703/1 |
| 2013/0304613 A1* | 11/2013 | Lopez | G06F 17/5004 |
| | | | 705/27.1 |
| 2016/0189264 A1 | 6/2016 | Mello, II | |

OTHER PUBLICATIONS

Ryan Moe Home Design, Custom Designed Garage Plans, published 2018, http://garage-plans.ryandmoe.com/design.php (Year: 2018).*

Michael Turner, Design Your Garage, Layout or Any Other Project in 3D for Free, published Aug. 10, 2016, https://garagespot.com/design-garage-3d-free-sketchup-make/ (Year: 2016).*

* cited by examiner

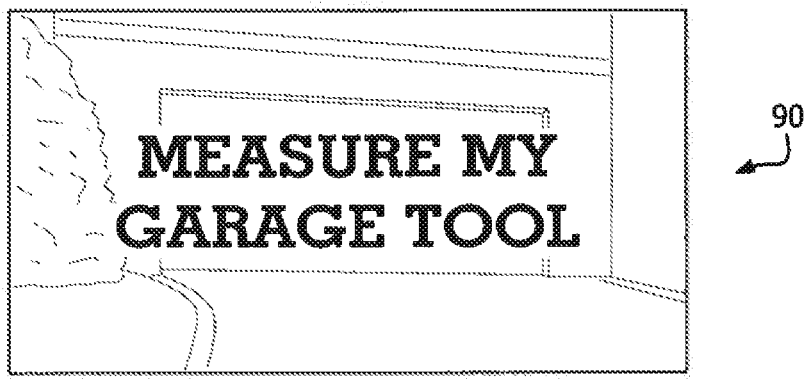

WE'LL FIND YOU THE PERFECT FIT

Our Garage Measuring Tool assists us in providing you with accurate estimates on new garage doors and openers without the need for an in-home appointment. You can easily follow the step-by-step measurements on your device*

*Hint 1: Turn off your screen's Auto Lock or Timeout feature.
*Hint 2: Remove car(s) from garage for easy measuring.

| Full Name |
| Email Address |
| Phone Number |
| Zip Code |

LET'S GET STARTED

FIG. 6

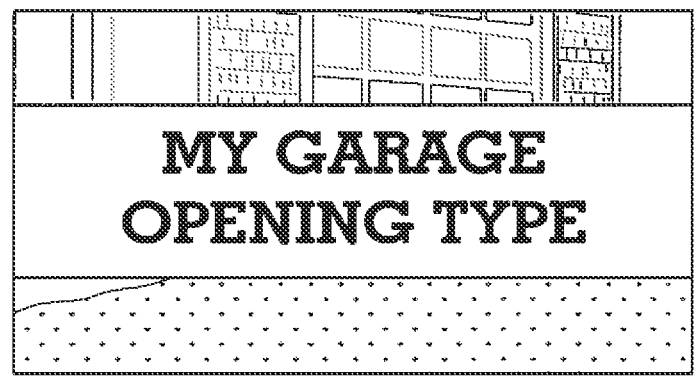
1 Single
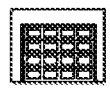
1 Double
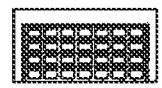
2 Single
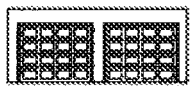
1 Single 1 Double
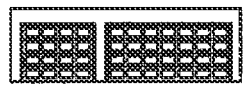
3 Single
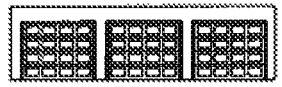
NEXT
FIG. 7

OBSTRUCTION

Are there any obstructions such as bulkheads or I-beams located in the ceiling of your garage?

☐ No, My Ceiling is Clear
☑ Yes, I have an Obstruction

| BACK | NEXT |

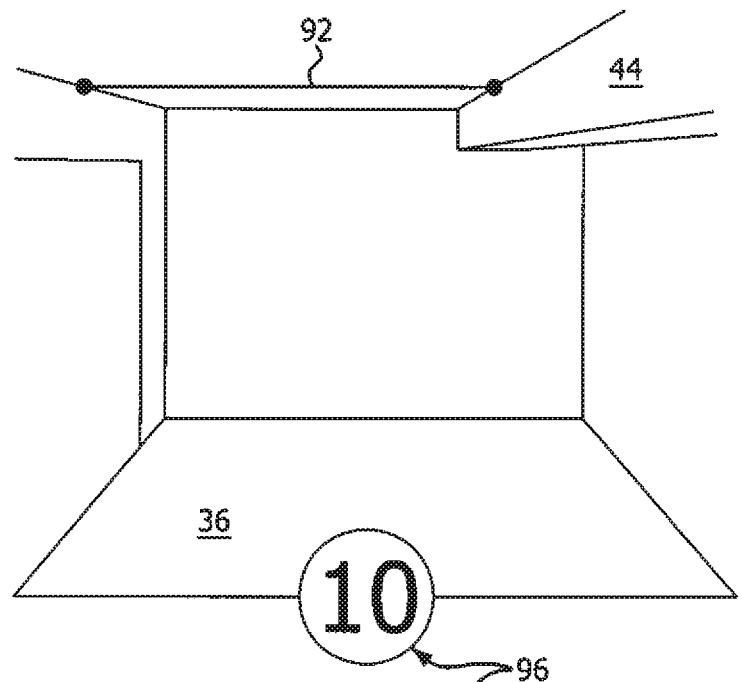
CEILING SPACE TO OBSTRUCTION
Front to Ceiling Obstruction. This is the clearance for door & opener.
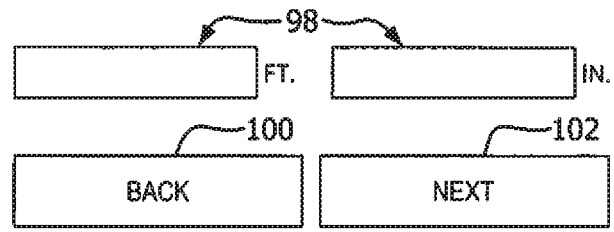
FIG. 17

TAKE A PICTURE OF YOUR GARAGE

If on a mobile device, click the button below to take a picture of your garage. Otherwise, click the button to upload a picture of your garage.

| Browse... | No file selected. |

| BACK | NEXT |

FIG. 19

FINAL QUESTIONS

Would you like the door(s) to be non-insulated or insulated?

☐ Non-Insulated

☐ Insulated

Would you like to add windows or keep it solid?

☐ Solid Door

☐ Windows

Do you have an existing garage door opener, looking to add a new garage door opener, or operate the door(s) manually?

☐ Use Existing Opener

☐ Add New Opener

☐ Operate Manually

| BACK | NEXT |
|------|------|

FIG. 20

REVIEW YOUR MEASUREMENTS

Please review your measurements before submitting.

FULL CEILING SPACE

[    ] FT.   [    ] IN.

CEILING SPACE TO OBSTRUCTION

[    ] FT.   [    ] IN.

OBSTRUCTION TO FLOOR

[    ] FT.   [    ] IN.

HEADROOM

[    ] FT.   [    ] IN.

OPENING HEIGHT

[    ] FT.   [    ] IN.

LEFT OPENING WIDTH

[    ] FT.   [    ] IN.

RIGHT OPENING WIDTH

[    ] FT.   [    ] IN.

LEFT SIDE

[    ] FT.   [    ] IN.

BETWEEN OPENING 1 AND 2

[    ] FT.   [    ] IN.

RIGHT SIDE

[    ] FT.   [    ] IN.

[ SUBMIT MY MEASUREMENTS ]

FIG. 21

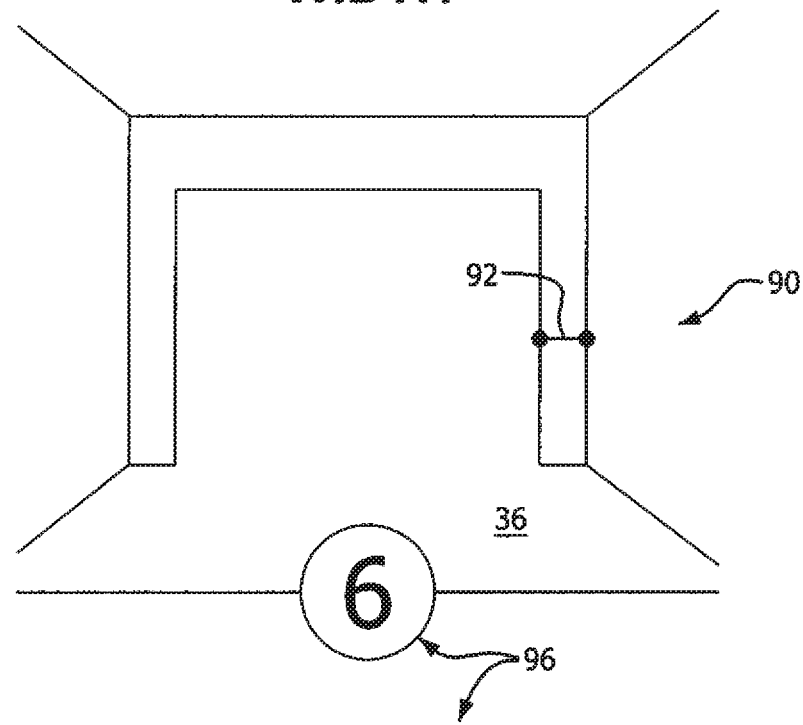
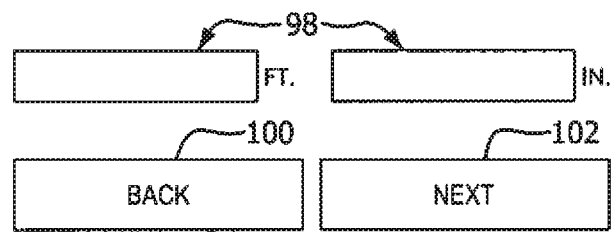
FIG. 28

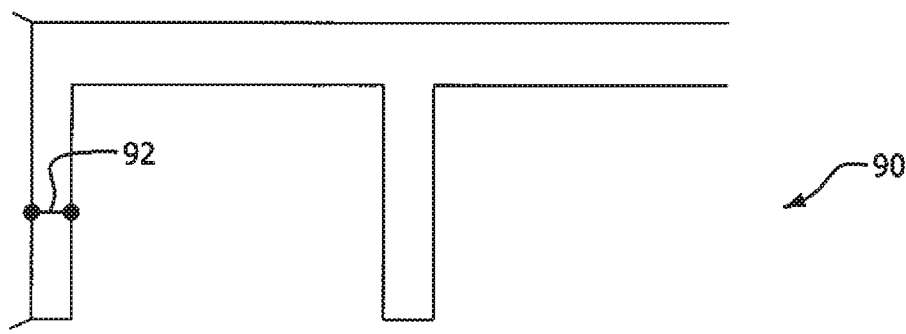
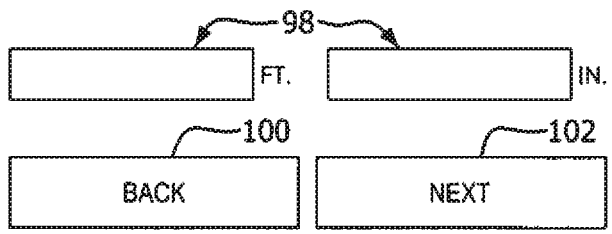
FIG. 29

APPARATUSES AND METHODS FOR GRAPHICAL USER INTERFACE DISPLAY TO INCREASE COMPLETENESS AND ACCURACY OF MEASURED PARAMETER VALUES FOR INSTALLATION OF GARAGE DOORS

BACKGROUND

Field

A technical solution is provided that uses dynamic graphical user interface displays to increase completeness and accuracy of determining values for installation parameters needed to install one or more garage doors and related equipment in different garage door installation environments.

Description of Related Art

With reference to FIG. 1, garage door (GD) installations typically involve one or more garage doors such as garage doors 10a and 10b (GDs) that are installed on a track system, and are moved with the aid of a motorized unit or opener. The GDs can be residential garage doors or commercial bay, barn or garage doors, for example.

FIG. 2A illustrates an example GD installation that is a single garage door system 12. A door 10 comprises several sections 14 connected by hinges 16. The door sections 14 have rollers that move along side tracks 20a and 20b. An opener 22 with motor unit is mounted on the ceiling via supporting brackets 26 and fastening hardware and has a conventional connector 24 to the door comprising a segment extending between the opener 22 and door 10, a segment with drum 30, and a pulley system aided by a torsion spring 28 and extension spring 28'. The opener 22 responds to commands from a wireless or wired remote opener or door control unit 34 such as a dedicated hand-held device, or a wall-mounted user interface, or mobile phone app interface, or vehicle control device. Door reinforcements 32 can be provided.

FIG. 2B illustrates another example GD installation that is a garage door system 12 with two doors 10a and 10b. Similar parts are provided with similar reference numerals. Each door 10a and 10b has respective side tracks (i.e., tracks 20a and 20b for door 10a and tracks 20c and 20d for door 10b). As depicted in FIGS. 2A and 2B, space on the vertical sides of the doors 10a and 10b and above the doors is needed to accommodate the tracks 20 and supporting brackets 26 and other hardware. Further, the common space between adjacent doors 10a and 10b needs to accommodate the supporting bracket(s) 26 for both of the doors (e.g., bracket 26b supporting tracks 20b and 20c of the respective doors 10a and 10b as illustrated in FIG. 2B).

GD installations involve more than measuring door openings to select correctly sized garage doors 10. GD installations also involve taking into consideration side and top clearances, that is, the amount of space above each door 10 opening (i.e., head space) and on each side of the door(s) (i.e., side space) to select the other necessary parts for the door system 12 (e.g., tracks 20, opener type 22 and torsion/extension springs 28/28'). If more than one door is needed for a GD installation, then shared space between adjacent openings needs to be taken into consideration to select tracks 20 and related supporting and fastening hardware for adjacent doors that will fit in the shared space.

No systemized guidance is presently available for accurately and completely measuring all values for parameters needed for successful GD installation, particularly when many different types of GD installations exist (e.g., installations with only a single door, or with double or triple doors). Further, no systemized guidance is presently available for accurately and completely measuring values for installation parameters relating to unique features of a GD installation environment including obstructions such as columns for utilities (e.g., plumbing or HVAC ducts) or structural reinforcement that can differ from one installation to the next.

SUMMARY

The above and other problems are overcome, and additional advantages are realized, by illustrative embodiments.

It is an aspect of illustrative embodiments to provide a method for displaying parameters for improved garage door installation design, the method comprising, in response to selection of a garage door (GD) installation type, generating on a display device a graphical user interface (GUI) screen depicting at least one portion of a GD installation environment corresponding to the selected GD installation type. The GD installation environment is selected from a group of different GD installation environments that each have different numbers of GD openings and different combination of installation parameters corresponding to different GD opening dimensions, different head room dimensions and different side room dimensions associated with each GD opening in that GD installation environment. A parameter indicator is dynamically generated in a selected region in at least one portion of the GD installation environment that corresponds to a parameter from among the combination of installation parameters associated with the selected GD installation type and determine a value for the parameter. In response to a user input, another parameter indicator is dynamically generated in a selected region in at least one portion of the GD installation environment that corresponds to another parameter from among the combination of installation parameters associated with the selected GD installation type and determine a value for the other parameter. In response to respective additional user inputs, respective additional parameter indicators are dynamically generated in respective selected regions in at least one portion of the GD installation environment that correspond to remaining parameters among the combination of installation parameters associated with the selected GD installation type and determine respective values for the remaining parameters. A GD installation design is generated that includes selected parts comprising one or more garage doors, a track and spring configuration and an opener using the values determined for the combination of installation parameters associated with the selected GD installation type. The selected parts are selected from the group consisting of different garage doors having respective GD opening dimensions, different types of track and spring configurations having respective head room dimension requirements and side room dimension requirements and different types of openers having respective head room dimension requirements.

In accordance with aspects of illustrative embodiments, the parameter corresponds to a head room dimension, the other parameter corresponds to an opening height of one or more GD openings, and the remaining parameters correspond, respectively, to an opening width of the GD, and side room dimensions corresponding to at least one of an amount of space on each side of an opening and an amount of space between adjacent openings.

In accordance with aspects of illustrative embodiments, a different GUI screen is generated in response to one or more of the user input and the additional user inputs, the different GUI screen comprising an enlarged view of at least one of the selected region and the at least one portion of a GD installation environment.

In accordance with aspects of illustrative embodiments, respective GUI screens are generated in response to each of the user input and the additional user inputs, each of the respective GUI screens comprising the corresponding parameter indicator and alphanumerical characters providing at least one of a description corresponding to the parameter indicator and a sequence indication.

In accordance with aspects of illustrative embodiments, generating the parameter indicator comprises generating a starting point, and generating a dynamically extending line from the starting point to an ending point, wherein the starting point, dynamically extending line and ending point are displayed to define a corresponding one of the different GD opening dimensions, different head room dimensions, and different side room dimensions in the GD installation environment of the selected GD installation type.

In accordance with aspects of illustrative embodiments, the selected GD installation type comprises at least a first GD opening and a second GD opening, and to dynamically generate the respective additional parameter indicators further comprises: generating a graphical user interface (GUI) screen depicting at least one portion of the GD installation environment indicating the first GD opening, the second GD opening, a shared space dimension between the first GD opening and the second GD opening, a first side room dimension on the side of the first GD opening opposite the shared space dimension, and a second side room dimension on a side of the second GD opening opposite the shared spaced dimension; dynamically generating a first side room parameter indicator and determine a value corresponding to a first side room dimension; in response to a user input, dynamically generating a shared space parameter indicator and determine a value corresponding to a shared space dimension; and, in response to a user input, dynamically generating a second side room parameter indicator and determine a value corresponding to a second side room dimension.

In accordance with aspects of illustrative embodiments, the selected GD installation type comprises at least a first GD opening and a second GD opening, and to dynamically generate the respective additional parameter indicators further comprises: generating a graphical user interface (GUI) screen depicting at least one portion of the GD installation environment indicating the first GD opening, and the second GD opening; dynamically generating a first GD opening parameter indicator that corresponds to a width of the first GD opening and determine a value for the first GD opening parameter; and, in response to a user input, dynamically generating a second GD opening parameter indicator that corresponds to a width of the second GD opening and determine a value for the second GD opening parameter.

In accordance with aspects of illustrative embodiments, the GD installation environment has an obstruction and further comprising: generating a prompt on a GUI screen requesting confirmation from a user regarding presence of an obstruction in the GD installation environment; in response to a user input representing confirmation, and generating a graphical user interface (GUI) screen depicting at least one portion of the GD installation environment indicating the obstruction and dynamically generate a GD opening parameter indicator that corresponds to at least one of a dimension extending in a horizontal plane from a wall in the GD installation environment to the obstruction, and a dimension extending in a vertical plane from a floor in the GD installation environment to the obstruction.

It is an aspect of illustrative embodiments to provide a device for displaying parameters for improved garage door installation design, the device comprising: a display comprising a graphical user interface (GUI); a processor, communicatively coupled to the display, and configured to execute a program module; and a memory, communicatively coupled to the processor, and configured to store the program module. The program module comprises instructions to: in response to selection of a garage door (GD) installation type, generate on the display a GUI screen depicting at least one portion of a GD installation environment corresponding to the selected GD installation type, the GD installation environment being selected from a group of different GD installation environments that each have different numbers of GD openings and different combination of installation parameters corresponding to different GD opening dimensions, different head room dimensions and different side room dimensions associated with each GD opening in that GD installation environment; dynamically generate a parameter indicator in a selected region in at least one portion of the GD installation environment that corresponds to a parameter from among the combination of installation parameters associated with the selected GD installation type and determine a value for the parameter; in response to a user input, dynamically generate another parameter indicator in a selected region in at least one portion of the GD installation environment that corresponds to another parameter from among the combination of installation parameters associated with the selected GD installation type and determine a value for the other parameter, in response to respective additional user inputs, dynamically generate respective additional parameter indicators in respective selected regions in at least one portion of the GD installation environment that correspond to remaining parameters among the combination of installation parameters associated with the selected GD installation type and determine respective values for the remaining parameters; and generate a GD installation design including selected parts comprising one or more garage doors, a track and spring configuration and an opener using the values determined for the combination of installation parameters associated with the selected GD installation type, the selected parts being selected from the group consisting of different garage doors having respective GD opening dimensions, different types of track and spring configurations having respective head room dimension requirements and side room dimension requirements and different types of openers having respective head room dimension requirements.

In accordance with aspects of illustrative embodiments, the parameter corresponds to a head room dimension, the other parameter corresponds to an opening height of one or more GD openings, and the remaining parameters correspond, respectively, to an opening width of the GD, and side room dimensions corresponding to at least one of an amount of space on each side of an opening and an amount of space between adjacent openings.

In accordance with aspects of illustrative embodiments, the program module includes instructions to generate a different GUI screen in response to one or more of the user input and the additional user inputs, the different GUI screen comprising an enlarged view of at least one of the selected region and the at least one portion of a GD installation environment.

In accordance with aspects of illustrative embodiments, the program module further comprises instructions to generate respective GUI screens in response to each of the user input and the additional user inputs, the respective GUI screen comprising the corresponding parameter indicator and alphanumerical characters providing at least one of a description corresponding to the parameter indicator and a sequence indication.

In accordance with aspects of illustrative embodiments, wherein generate the parameter indicator comprises generate a starting point, and generate a dynamically extending line from the starting point to an ending point, wherein the starting point, dynamically extending line and ending point are displayed to define a corresponding one of the different GD opening dimensions, different head room dimensions, and different side room dimensions in the GD installation environment of the selected GD installation type.

In accordance with aspects of illustrative embodiments, the selected GD installation type comprises at least a first GD opening and a second GD opening, and to dynamically generate the respective additional parameter indicators further comprises: generate a graphical user interface (GUI) screen depicting at least one portion of the GD installation environment indicating the first GD opening, the second GD opening, a shared space dimension between the first GD opening and the second GD opening, a first side room dimension on the side of the first GD opening opposite the shared space dimension, and a second side room dimension on a side of the second GD opening opposite the shared spaced dimension; dynamically generate a first side room parameter indicator and determine a value corresponding to a first side room dimension; in response to a user input, dynamically generate a shared space parameter indicator and determine a value corresponding to a shared space dimension; and in response to a user input, dynamically generate a second side room parameter indicator and determine a value corresponding to a second side room dimension.

In accordance with aspects of illustrative embodiments, the selected GD installation type comprises at least a first GD opening and a second GD opening, and to dynamically generate the respective additional parameter indicators further comprises generate a graphical user interface (GUI) screen depicting at least one portion of the GD installation environment indicating the first GD opening, and the second GD opening; dynamically generate a first GD opening parameter indicator that corresponds to a width of the first GD opening and determine a value for the first GD opening parameter, and, in response to a user input, dynamically generate a second GD opening parameter indicator that corresponds to a width of the second GD opening and determine a value for the second GD opening parameter.

In accordance with aspects of illustrative embodiments, the GD installation environment has an obstruction and the program module includes instructions to: generate a prompt on a GUI screen requesting confirmation from a user regarding presence of an obstruction in the GD installation environment; in response to a user input representing confirmation, generate a graphical user interface (GUI) screen depicting at least one portion of the GD installation environment indicating the obstruction and dynamically generate a GD opening parameter indicator that corresponds to at least one of a dimension extending in a horizontal plane from a wall in the GD installation environment to the obstruction, and a dimension extending in a vertical plane from a floor in the GD installation environment to the obstruction.

In accordance with aspects of illustrative embodiments, the program module is configured to display at least one of the parameter indicators in the combination of installation parameters associated with the selected GD installation type in at least one of an image generated by camera and rendered in a measurement application, and a display screen viewed with the image. For example, the device is a mobile phone running the measurement application and the measurement application has an augmented reality kit such that the mobile phone can be pointed to a start point and an end point corresponding to the at least one of the parameter indicators, and the dimension between the start point and the end point is automatically measured to determine a value for the parameter indicator.

Additional and/or other aspects and advantages of illustrative embodiments of the present invention will be set forth in the description that follows, or will be apparent from the description, or may be learned by practice of the invention. The illustrative embodiments may comprise devices and methods for operating same having one or more of the above aspects, and/or one or more of the features and combinations thereof. The illustrative embodiments may comprise one or more of the features and/or combinations of the above aspects as recited, for example, in the attached claims.

BRIEF DESCRIPTION OF THE DRAWINGS

The above and/or other aspects and advantages of embodiments of the present invention will be more readily appreciated from the following detailed description, taken in conjunction with the accompanying drawings, of which:

FIGS. 6, 7, 8, 9, 10, 11, 12, 13, 14, 15, 16, 17, 18, 19, 20, 21, 22, 23, 24, 25, 26, 27, 28, 29, 30, 31 and 32 depict graphical user interface display screens generated in accordance with respective illustrative embodiments.

Throughout the drawing figures, like reference numbers will be understood to refer to like elements, features and structures.

DETAILED DESCRIPTION OF ILLUSTRATIVE EMBODIMENTS

Figure 1:
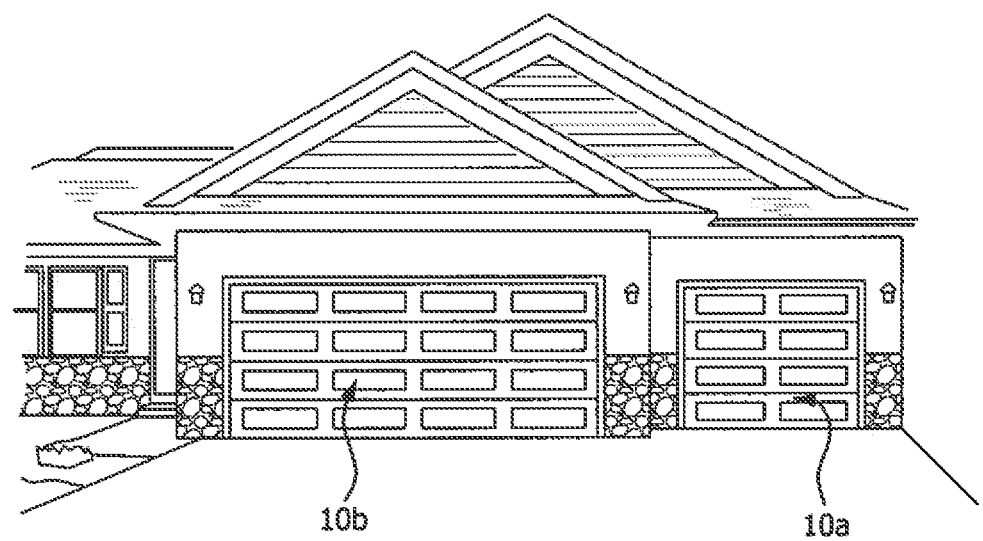
FIG. 1 depicts an example GD installation.

Reference will now be made in detail to example embodiments of the present invention, which are illustrated in the accompanying drawings. The example embodiments described herein exemplify, but do not limit, the present invention by referring to the drawings.

Figure 2A:
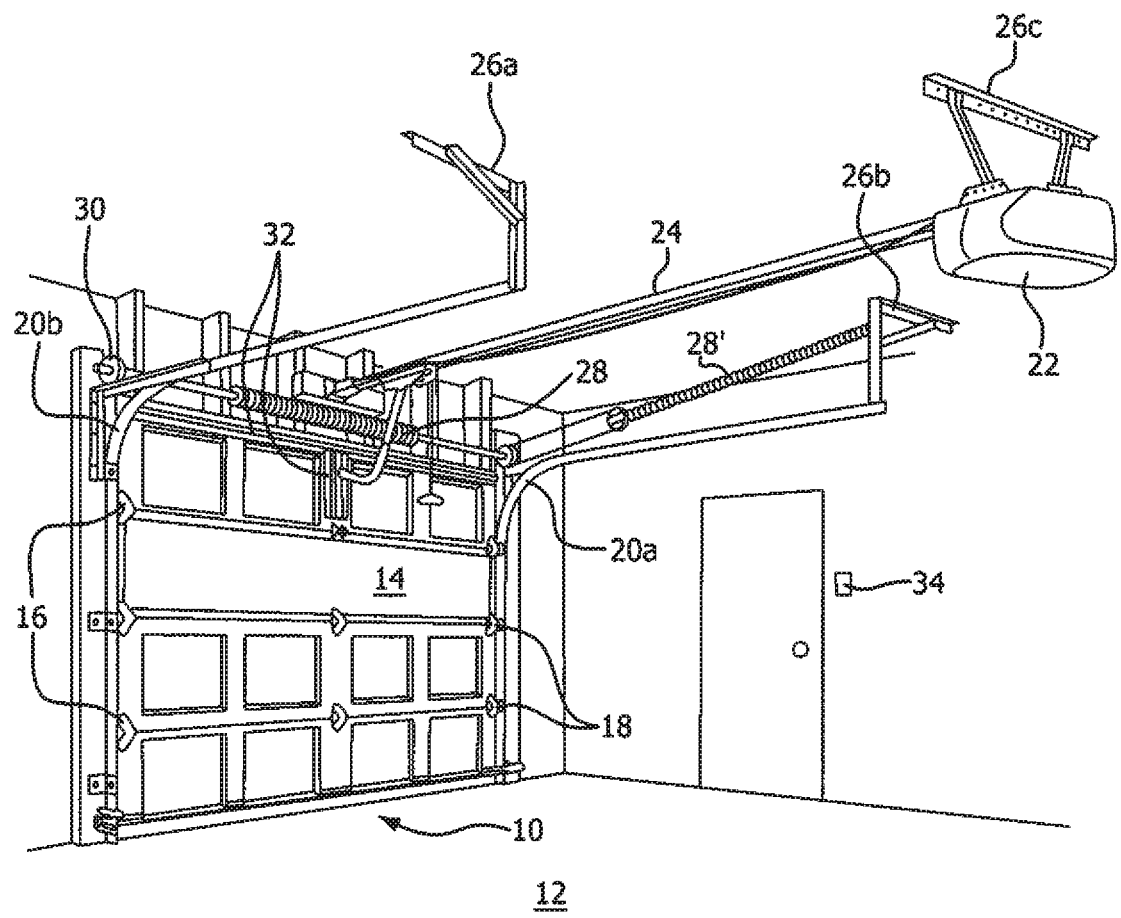
FIGS. 2A and 2B illustrate, respectively, example GD installation environments having a single door and double door.
Figure 2B:
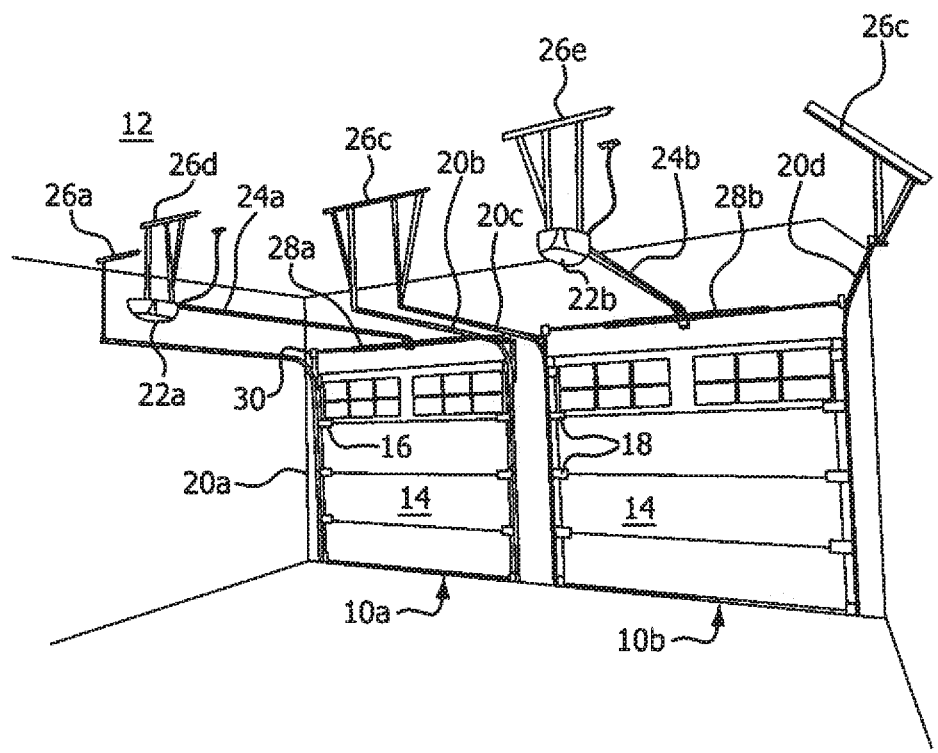
Figure 3:
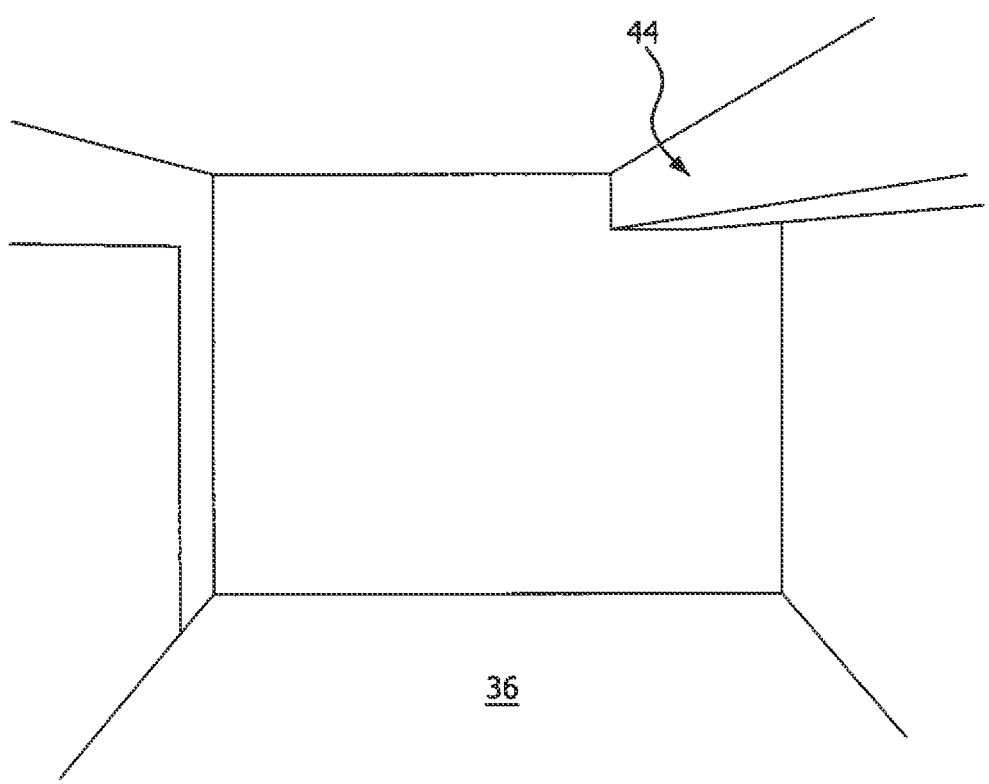
FIG. 3 is an example GD installation environment having an obstruction.

As stated above, garage door (GD) installations involve more than measuring door openings to select correctly sized garage doors 10. GD installations also involve taking into consideration side and top clearances, that is, the amount of space above each door 10 opening (i.e., head space) and on each side of the door(s) (i.e., side space) to select the other necessary parts for a door system 12 (e.g., tracks 20, opener type 22 and torsion/extension springs 28/28' as illustrated in FIGS. 1, 2A and 2B) and determine accurate pricing for the GD installation. Thus, accurate measurement of values for a number of installation parameters is necessary for a successful GD installation with accurate selection of parts and pricing for a GD system 12 that fit in the intended GD installation environment. The number of installation parameters is impacted by the GD installation type (e.g., single door, or multiple doors) and by the presence of any obstructions in the GD installation environment. For example, FIG. 3 illustrates a ceiling obstruction 44 in an example GD installation environment 36.

If values for installation parameters are not accurately measured or not measured at all, a GD installation cannot be accurately designed with parts for a GD system 12 that will fit in the intended GD installation environment 36. Further, accurate pricing for the GD installation are not be achieved. An error in GD installation design causes delay in installation and possible added expense to the installer or installation business as alternative parts for a GD system 12 are selected and procured. In addition, errors or omissions in measurements of values for installation parameters can result in a GD installer or other personnel having to make multiple trips to the site of the GD installation, which further increases inconvenience to both the installer and buyer and expense to the installation business and therefore decreases profit.

In accordance with an aspect of illustrative embodiments, a device 60 with a display 54 (e.g., FIG. 4) is configured to generate one or more graphical user interface (GUI) screens 90 (e.g., FIGS. 6-35) that depict at least one parameter indicator 92 in a selected region 94 of at least a portion of a depicted GD installation environment 36. Different GD installation types (e.g., one, two, or three doors 10) are characterized by different combinations of installation parameters. In accordance with another aspect of illustrative embodiments, the device 60 with display 54 is configured to generate one or more screens 90 with different parameter indicators 92 depending on the combination of installation parameters for a selected GD installation type to ensure completeness of installation parameter values (e.g., that no installation parameter was inadvertently overlooked and omitted). In addition, the device 60 with display 54 is configured to dynamically display the different parameter indicators 92 to improve user understanding of the corresponding installation parameters, thereby improving accuracy for a value procured for each installation parameter corresponding to respective ones of the parameter indicators 92. The device 60 with display 54 is also configured to display enlarged views of regions 94 in the GD installation environment 36 that are pertinent to respective installation parameters to more clearly generate and display the corresponding parameter indictor 92 to further facilitate user understanding of the corresponding installation parameters.

Figure 4:
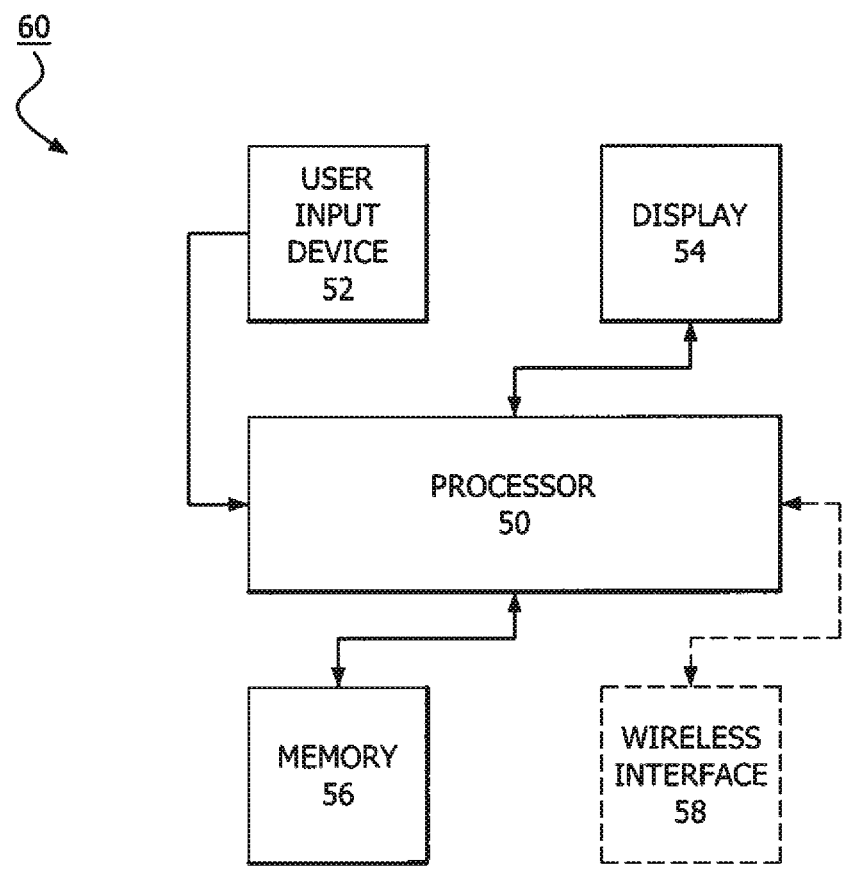
FIG. 4 is a block diagram of components in an example device configured to generate a graphical user interface display in accordance with an illustrative embodiment.

With reference to FIG. 4, the device 60 with display 54 can be, for example, a computer with display, a laptop, an iPad, a mobile phone, among other computing devices with integral or separate displays. The display 54 can be a touchscreen display, or liquid crystal display (LCD) screen without touchscreen interface. The device 60 can further comprise a processor 50 or other processing device that is programmed or otherwise configured to generate GUI screens 90 and parameter indicators 92 in accordance with illustrative embodiments, among other computing device operations. The device 60 also comprises a memory 56 and user input device 52 that can be integral with the display 54 (e.g., a touchscreen interface) and/or separate from the display 54 (e.g., a keyboard and/or mouse). The device 60 can also have an optional wireless interface 58 such as a cellular service or WiFi interface for communicating with a remote device via a cellular network and/or a wired or wireless local area network optionally connected to a wide area network via an access point.

Illustrative operations of the device 60 will now be described with reference to FIGS. 5A and 5B and example screens 90 depicted in FIGS. 6 through 32. Illustrative embodiments can be implemented as a software-based display and GD installation parameter value procurement tool comprising an algorithm executed by the processor 50 (e.g., stored in memory on the processor or in the memory 56). The algorithm can be configured to generate a screen 90 as shown in FIG. 6 on the display 54 that is, for example, an optional home screen. With reference to block 70 in FIG. 5A, the algorithm generates a screen 90 as shown in FIG. 7 on the display 54 that is a GD installation type selection screen. A user has the option of selecting, via the user input device 52, one of a plurality of GD installation types comprising, but not limited to, an installation of a single door, an installation comprising one double-wide door, a two single door installation, an installation comprising a single door and a double-wide door, and an installation with three single doors, depending on the door openings of the GD installation environment 36. For example, each of the GD installation types can be implemented as respective touchscreen input buttons to input a GD installation type selection. Each of the different GD installation types is characterized by different combinations of installation parameters that are selected from a group comprising, but not limited to, a plurality of different door opening heights, a plurality of different door opening widths, different head room dimensions and different side room dimensions. As described in more detail below, the tool generates different sequences of screens 90 relative to respective GD installation types to facilitate procurement of more accurate values for the installation parameters in the combination of installation parameters corresponding to a selected GD installation type.

Figure 5A:
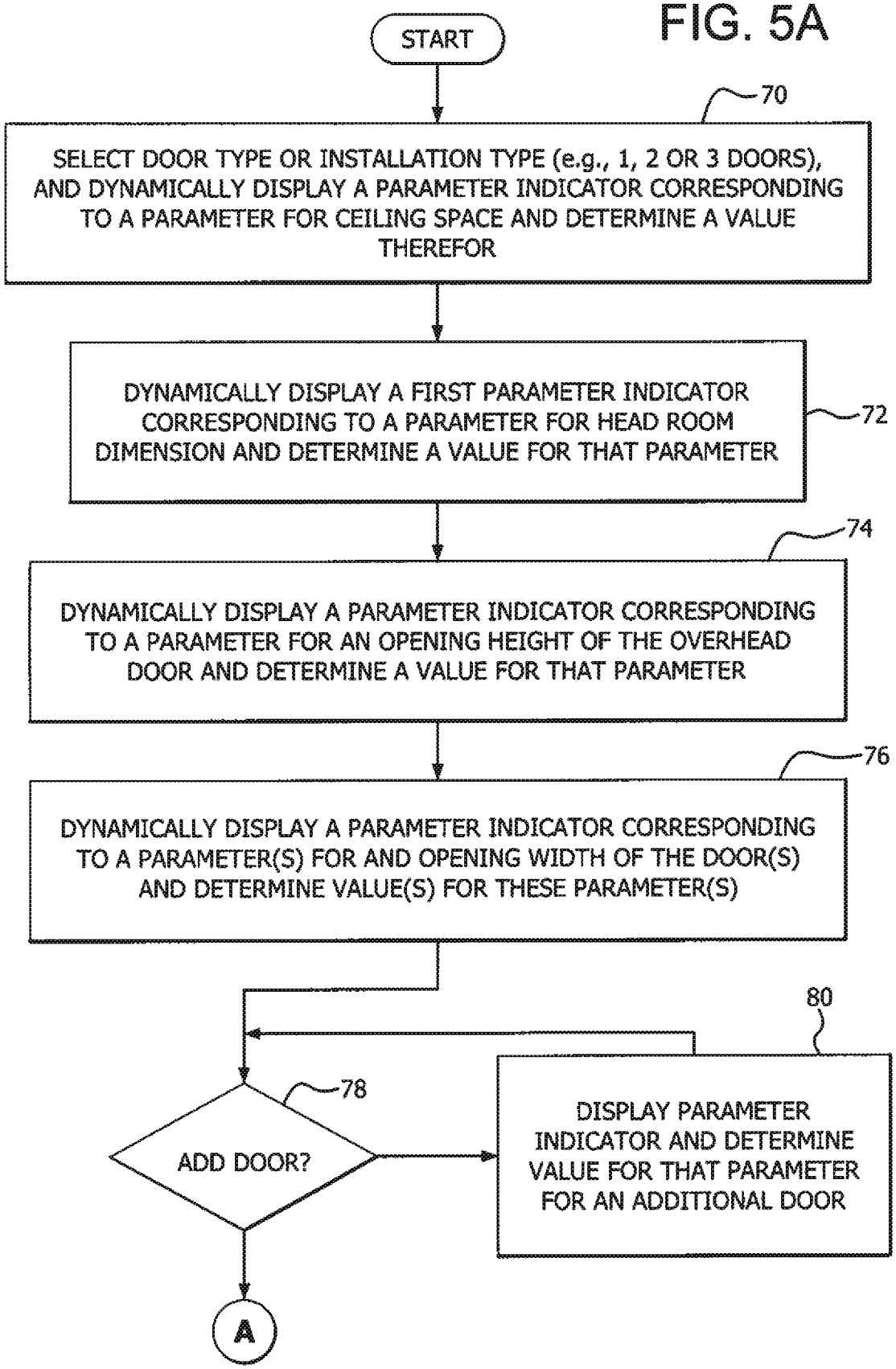
FIGS. 5A and 5B depict a flow chart of illustrative operations of an example device configured to generate graphical user interface displays in accordance with an illustrative embodiment.
Figure 8:
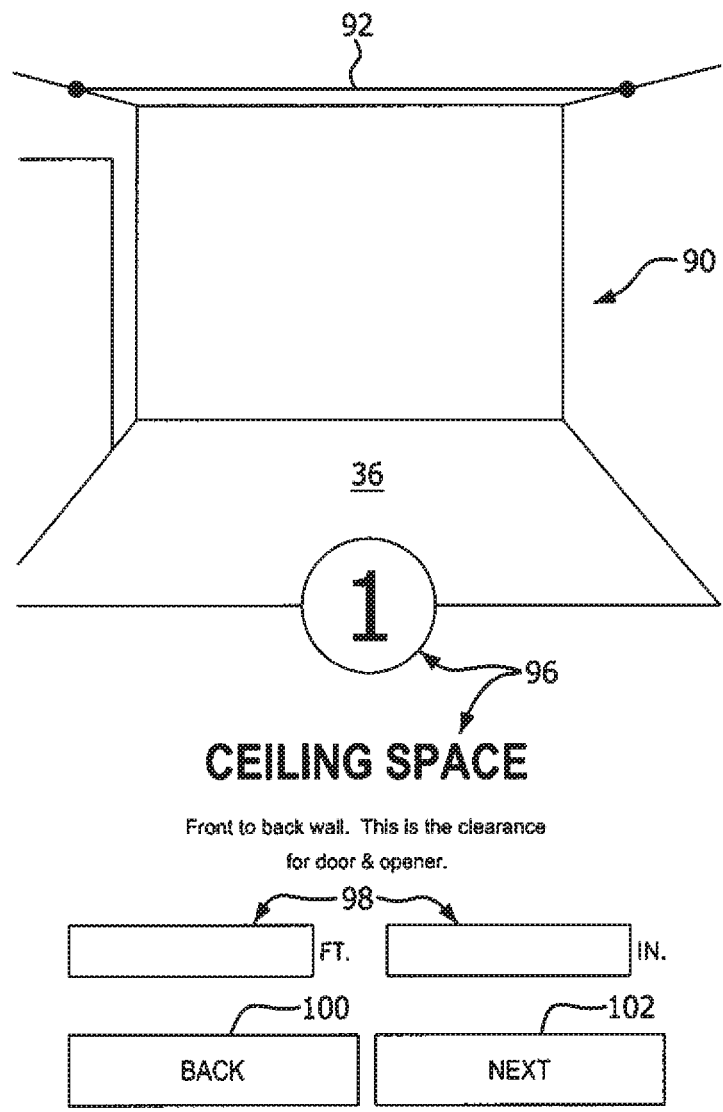

With continued reference to block 70 in FIG. 5A, the algorithm generates a screen 90 as shown in FIG. 8 on the display 54 that is a ceiling space screen. A ceiling space parameter in GD installations corresponds to a dimension from a front wall of a GD installation environment 36 (e.g., a residential garage) to an opposite back wall. The ceiling space parameter is important to determine clearance for the door 10, opener 22 and opener connection to door. The screen 90 comprises a parameter indicator 92, and an optional sequence indicator and/or parameter description 96. The sequence indicator can be an alphanumeric character or other indicia conveying to a user which of a number of values is needed for the combination of installation parameters that corresponds to the selected GD installation type. The screen 90 can also have a user input screen field(s) for entry of the measured value corresponding to the parameter indicator 92, and front 102 and back 100 button inputs for, respectively, advancing to the next screen (e.g., screen 90 in FIG. 9) or returning to a prior screen 90.

Figure 33:
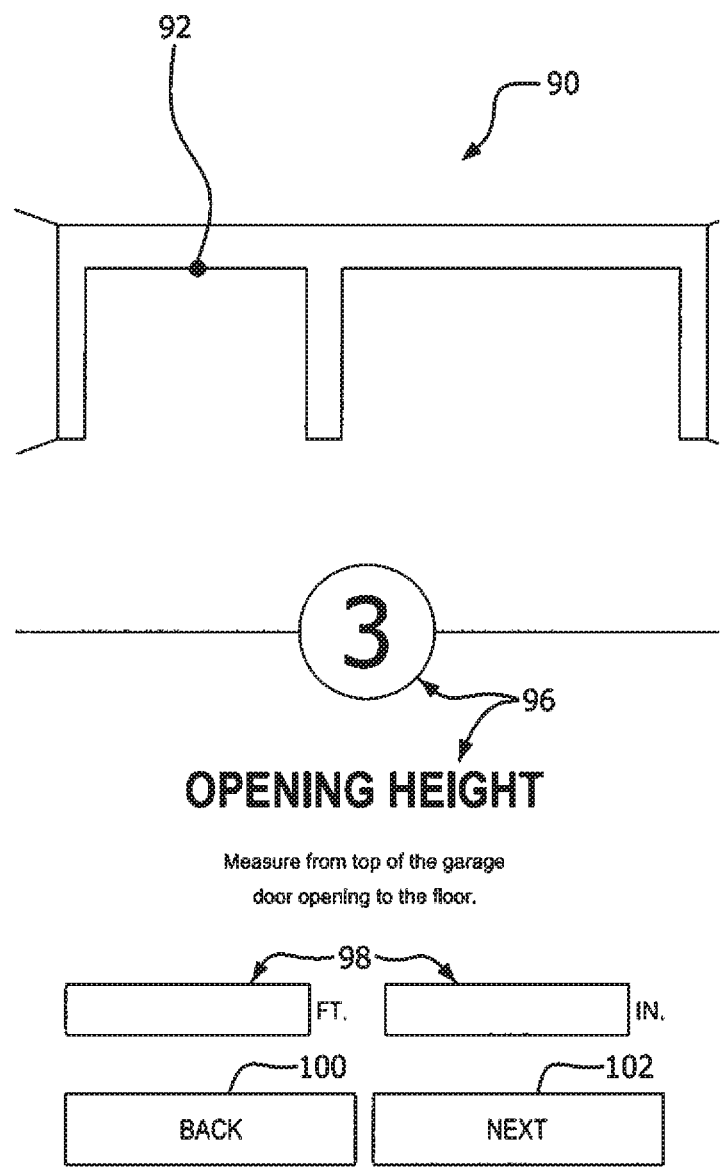
FIGS. 33, 34 and 35 each depict an illustrative animated graphical user interface display screen with a dynamically generated parameter indicator in different respective stages of rendering on the graphical user interface display screen.
Figure 34:
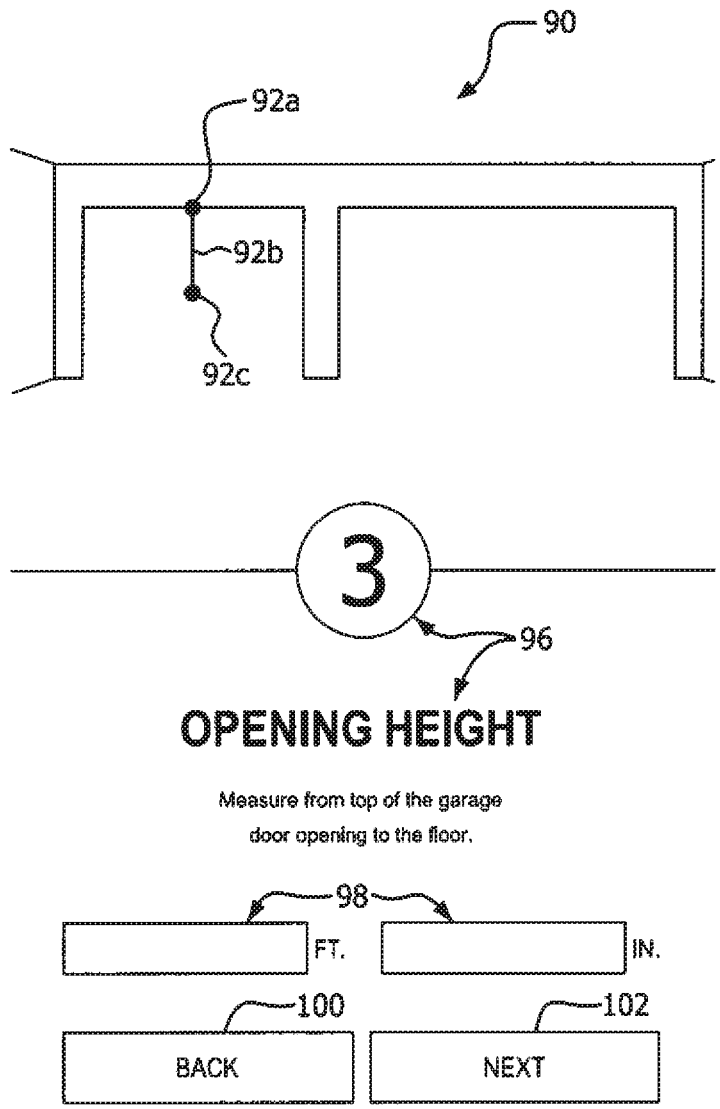
Figure 35:
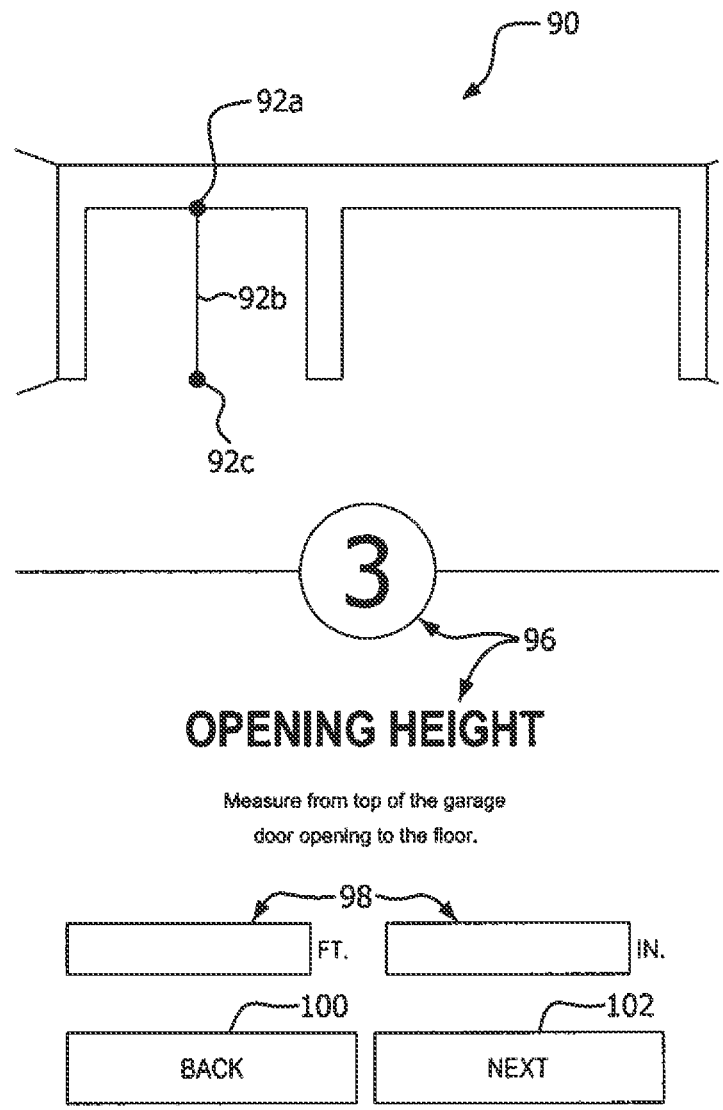

Screen features having similar function in other screens are given similar references numerals (e.g., a parameter indicator 92, region 94, sequence indicator and/or parameter description 96, value input field(s) 98, back button 100 and front button 102). With reference to FIGS. 33 through 35, any of the parameter indicators 92 depicted in the example screens 90 in FIGS. 6-32 can be dynamically generated to aid visualization of the parameter by a user to thereby aid accurate procurement of a value corresponding to the parameter. For example, the parameter indicator 92 can be a dynamically generated line or arrow 92b that dynamically extends from a starting point 92a of the parameter dimension to be measured, and grows in length until the line or arrow 92b reaches an end point 92c at the opposite end of the dimension being measured. It is to be understood that other form factors for the parameter indicator 92 can be used besides a single line or arrow and that dots representing starting and ends points 92a, 92c are optional.

Figure 9:
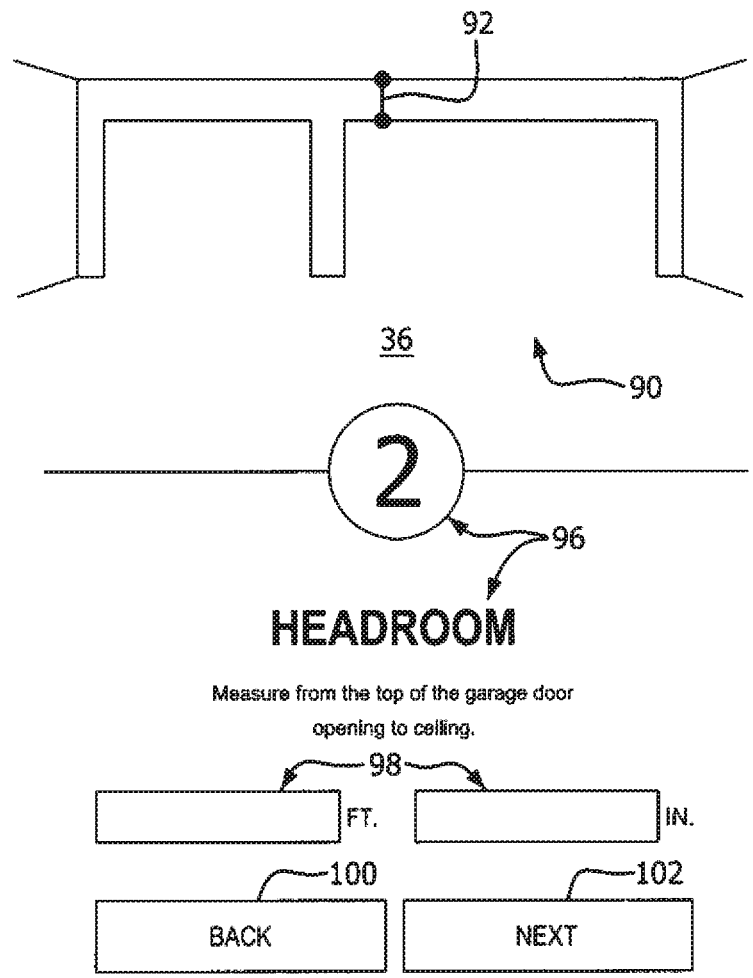

With reference to block 72 in FIG. 5A, the algorithm generates a screen 90 as shown in FIG. 9 on the display 54 that is a head room screen. A head room parameter in GD installations corresponds to a dimension measured from a top of a door 10 to a ceiling in the GD installation environment 36. The head room parameter is important to ensure that the selected opener 22 and related supporting hardware and side tracks 20 and supporting brackets 26 have sufficient room to not impinge on door operation.

Figure 10:
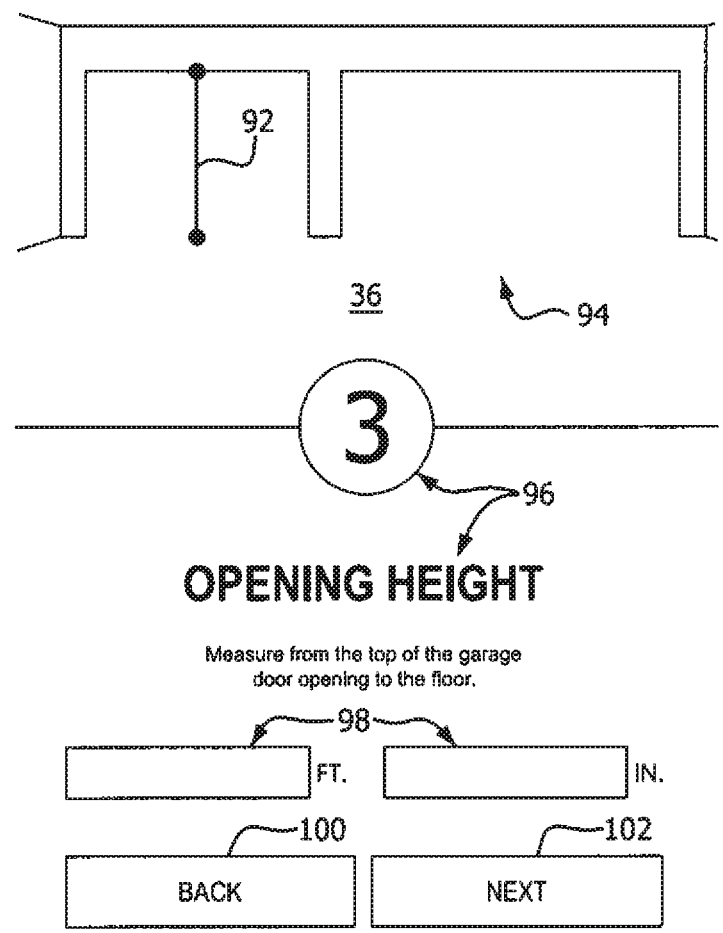

With reference to block 74 in FIG. 5A, the algorithm generates a screen 90 as shown in FIG. 10 on the display 54 that is an opening height screen. An opening height parameter in GD installations corresponds to a dimension measured from a top of a door 10 to a floor in the GD installation environment 36. The opening height parameter is important to ensure that a door 10 is accurately selected to fit in an opening of a GD environment 36 (e.g., a garage door opening constructed into a front wall of a residential garage).

Figure 11:
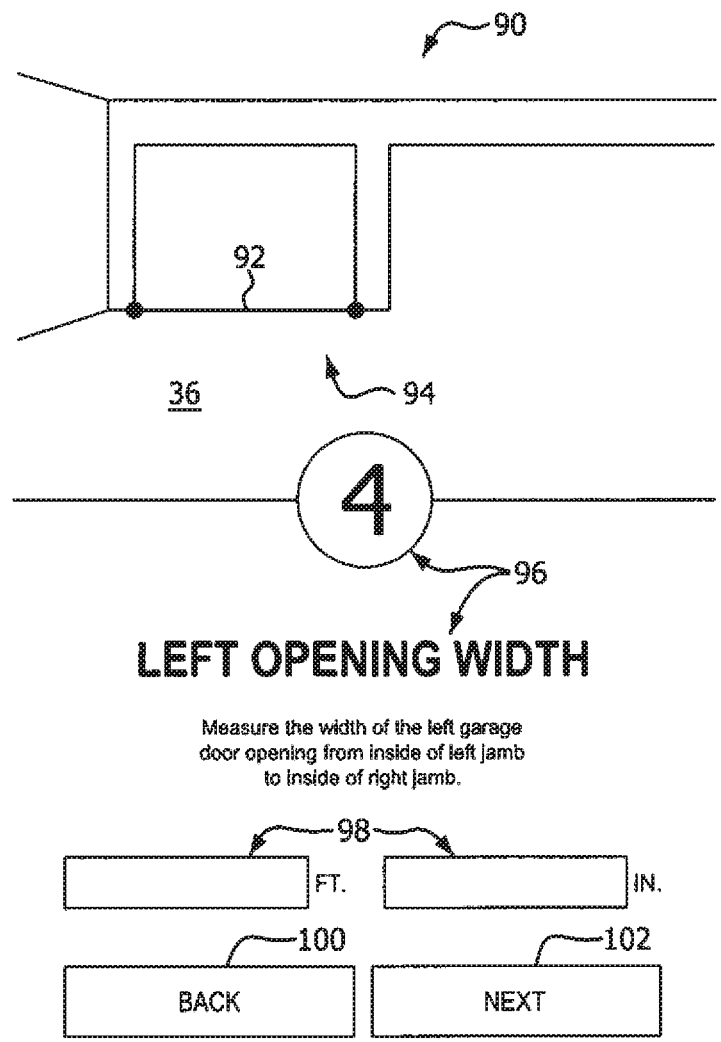
Figure 12:
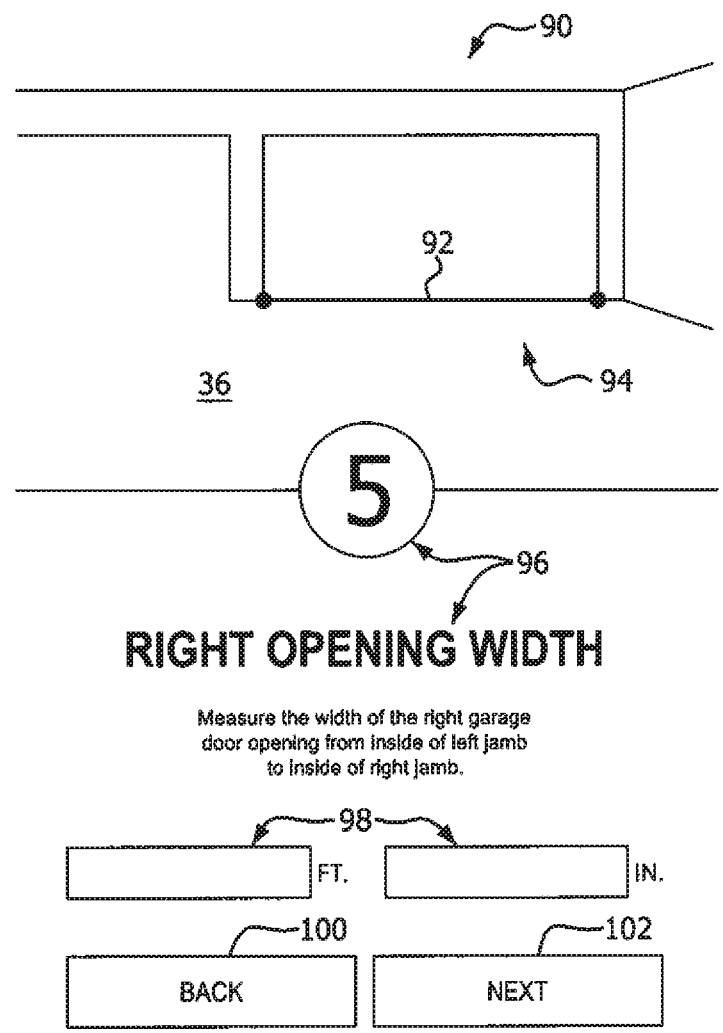
Figure 24:
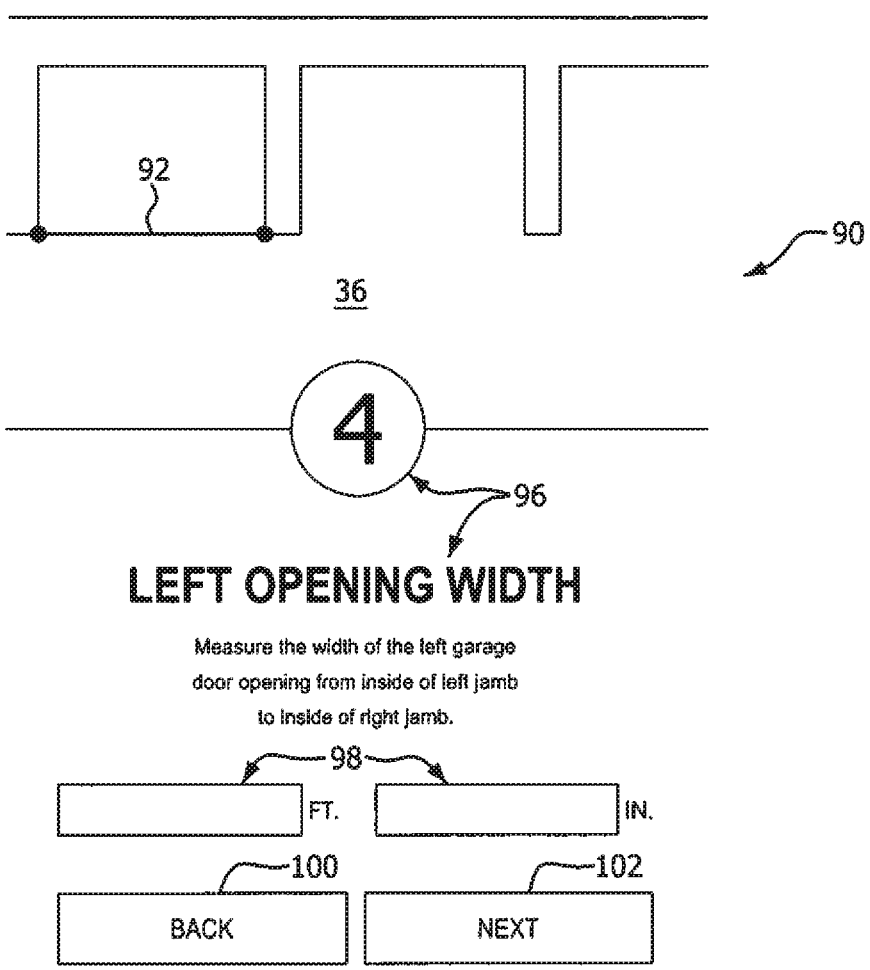
Figure 25:
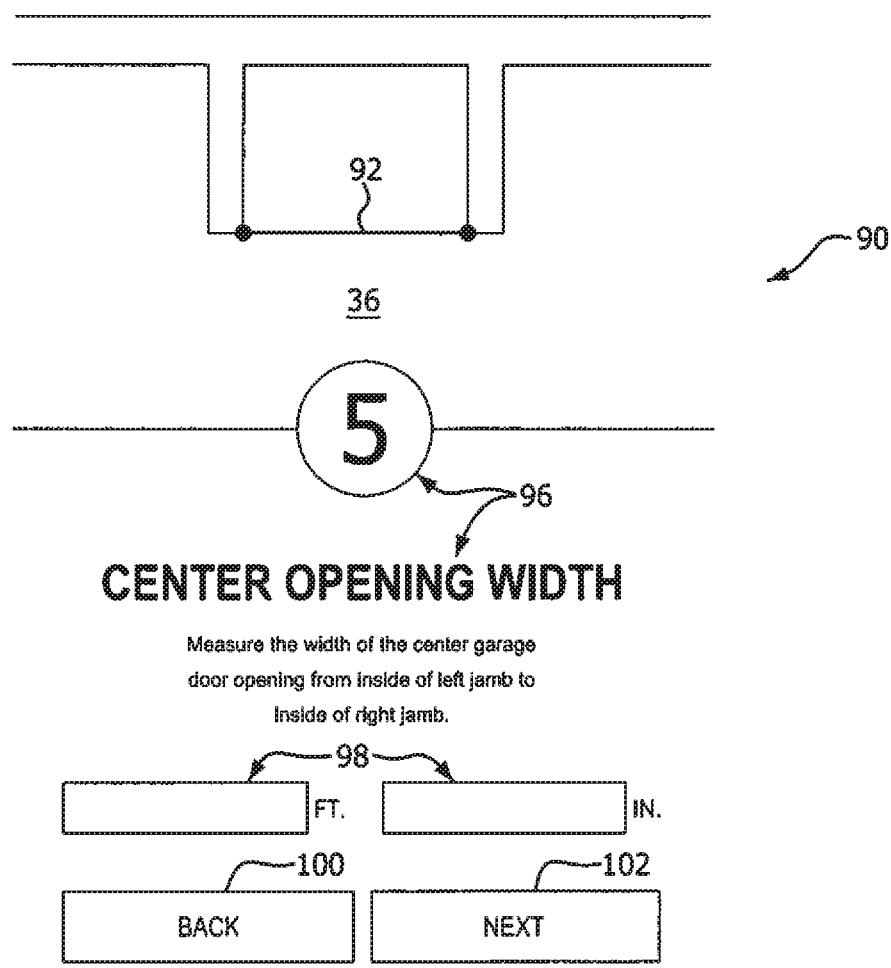
Figure 26:
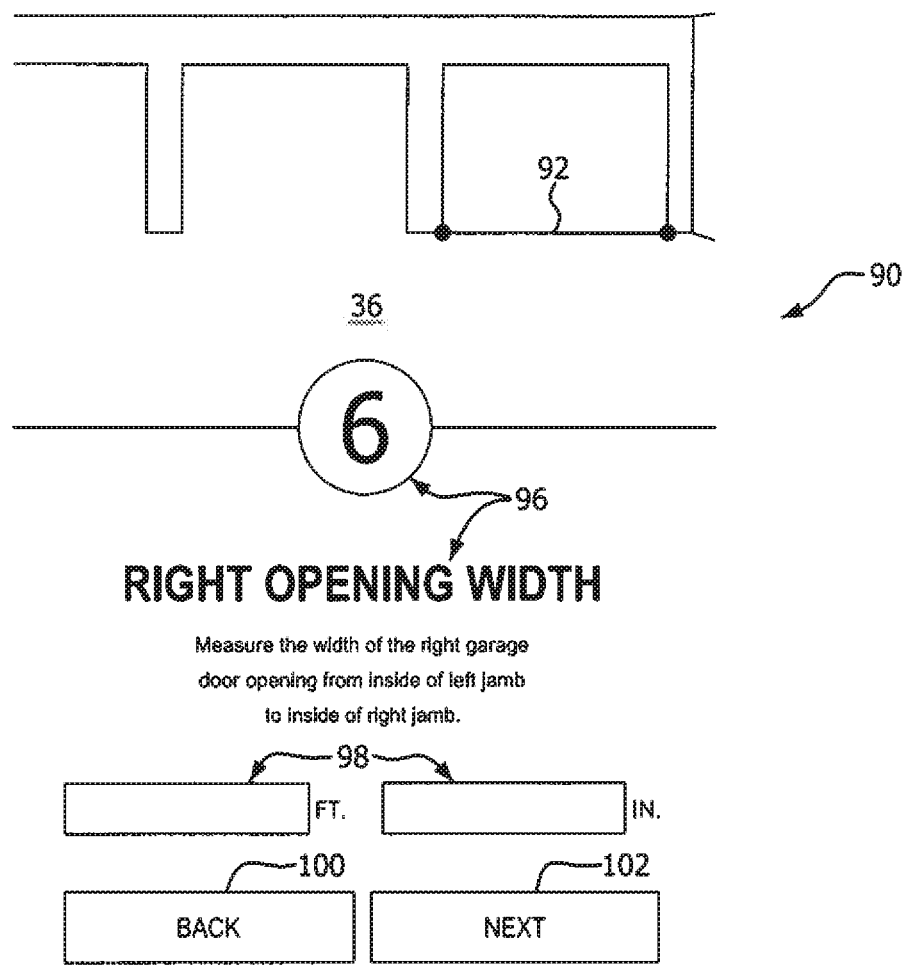
Figure 27:
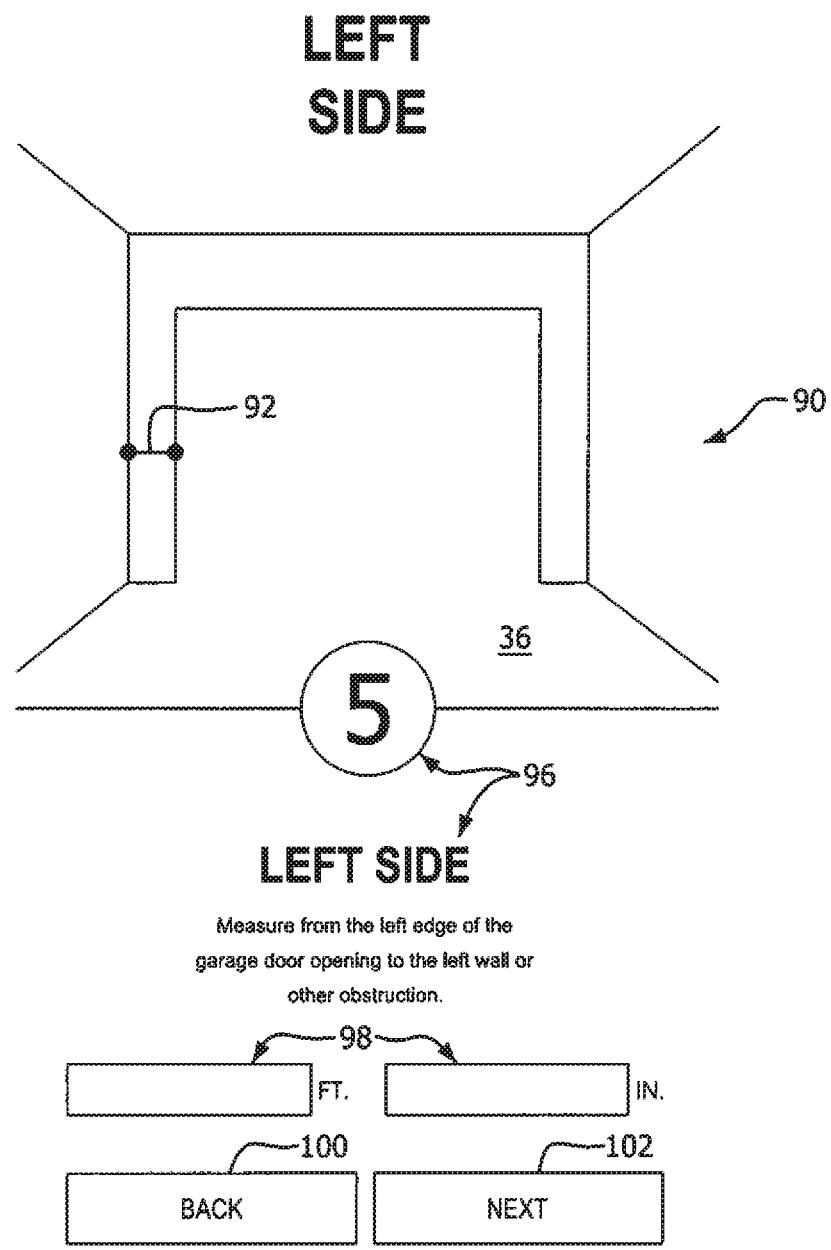
Figure 30:
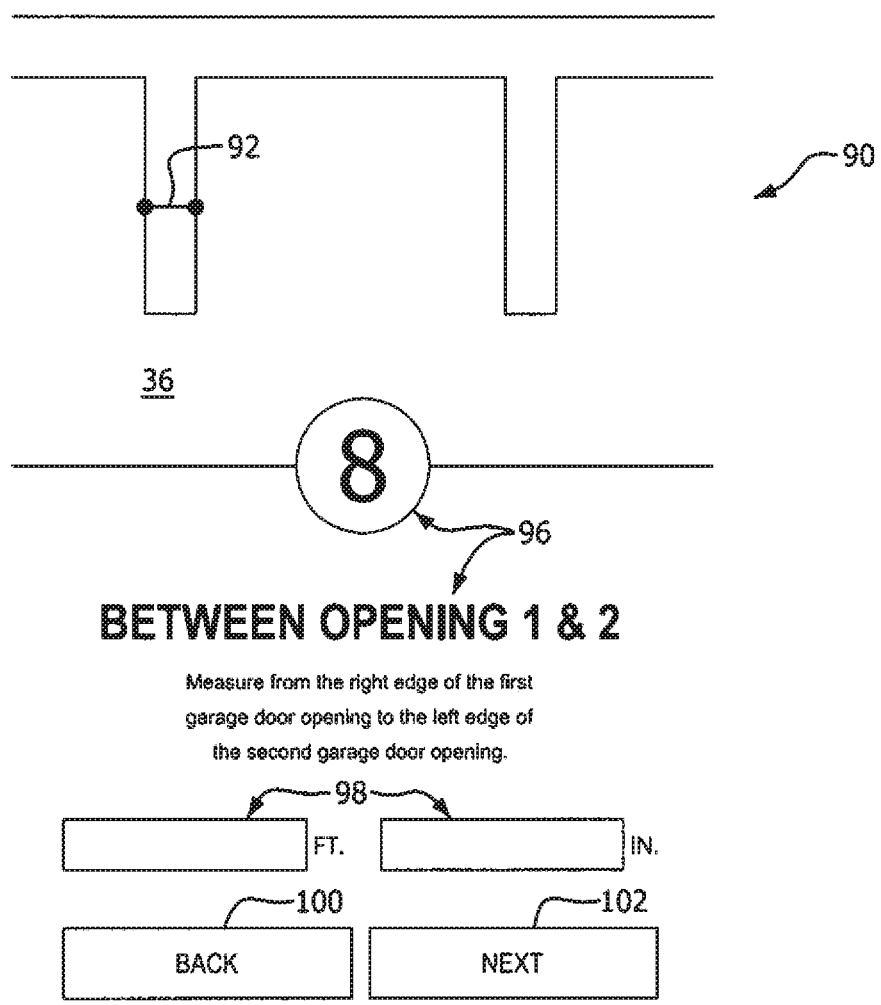
Figure 31:
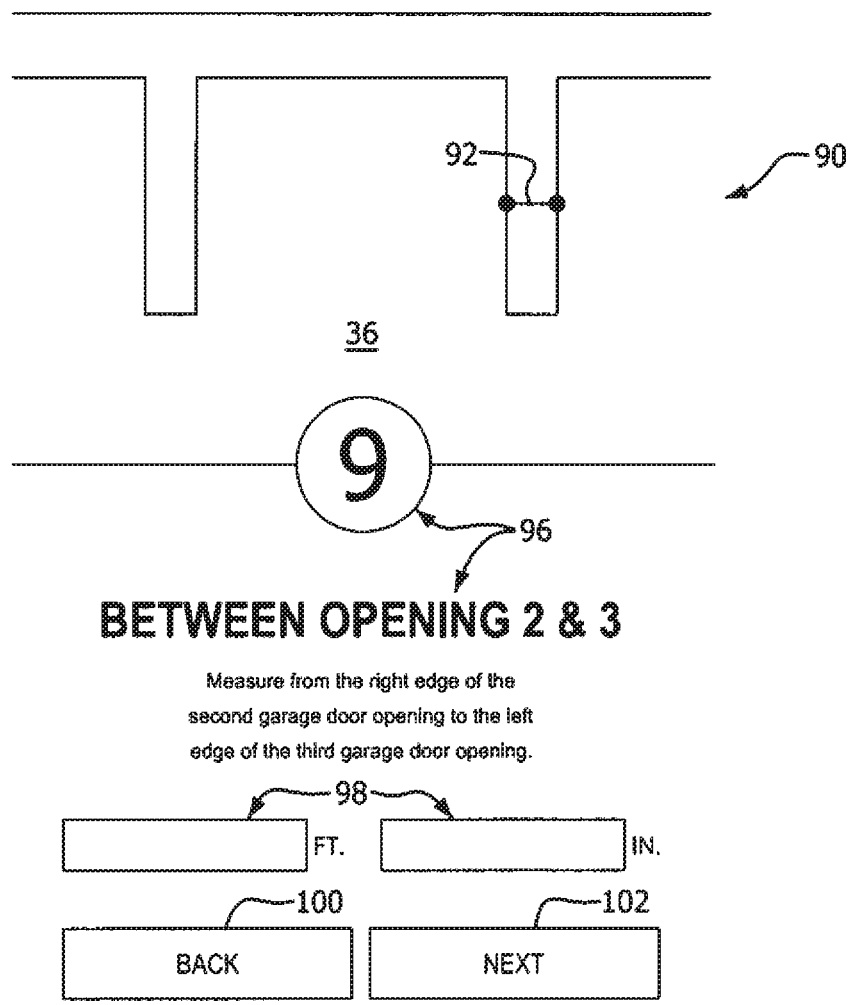
Figure 32:
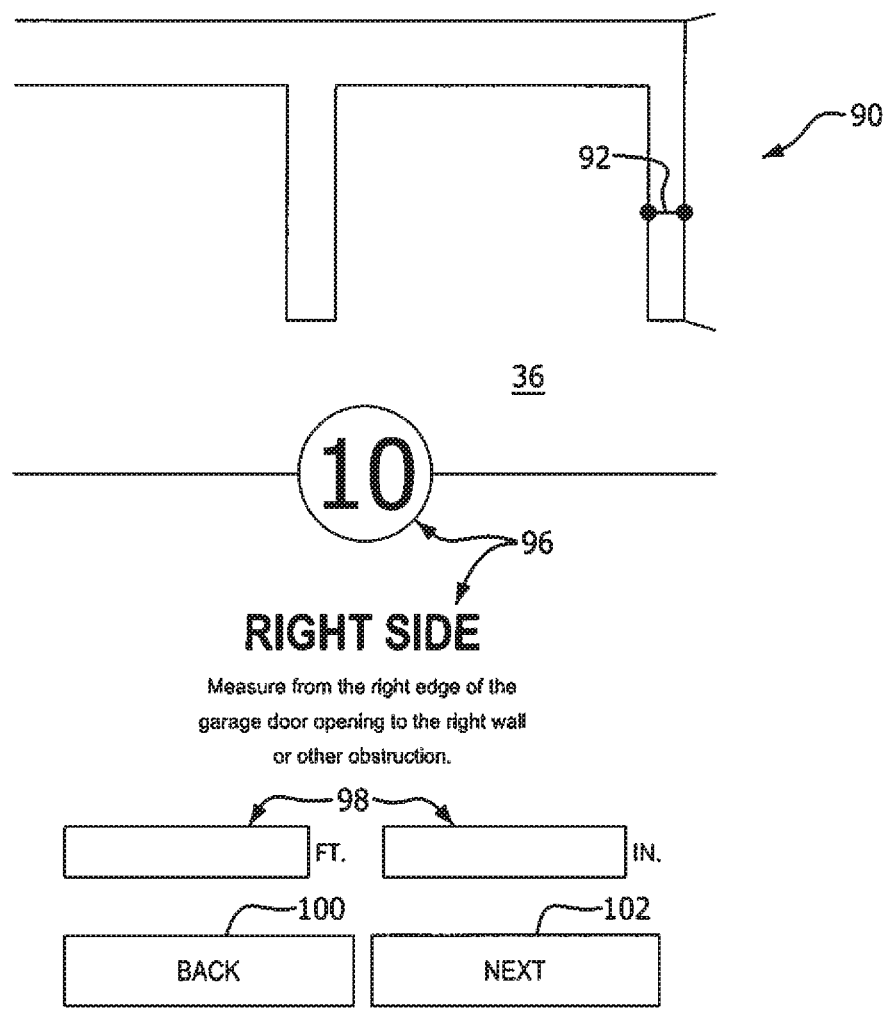

With reference to block 76 in FIG. 5A, the algorithm generates screens 90 as shown in FIGS. 11 and 12 on the display 54 that are respectively a left opening width screen and a right opening width screen for an example double door GD installation type. An opening width parameter in GD installations corresponds to a dimension measured from inside of a left jamb of a door opening to inside of a right jamb of the door opening. The opening width parameter is important to ensure that a door 10 is accurately selected to fit in an opening of a GD environment 36 (e.g., a garage door opening constructed into a front wall of a residential garage). With reference to blocks 76, 78 and 80 in FIG. 5A, the algorithm generates a screen (FIG. 11) for an opening width parameter for a first door. After determination of a value for a first door opening width parameter and a user input, the algorithm can generate another opening width screen for a different door (FIG. 12). The number and sequence of opening width screens 90 changes depending on the GD installation type (e.g., one, two, or three doors 10) selected by the user. Also, the depicted GD environment 36 changes, as illustrated by the differences in the two door GD environment 36 depicted in FIG. 11 or 12 as compared with a one door GD environment 36 depicted in the opening width screen depicted in FIG. 23. Further, FIGS. 24, 25 and 26 depict example opening width screens that are generated by the algorithm for a three door GD installation type instead of the screens 90 in FIGS. 11 and 12 for a two door GD installation type or the screen in FIG. 23 for a one door GD installation type.

Figure 5B:
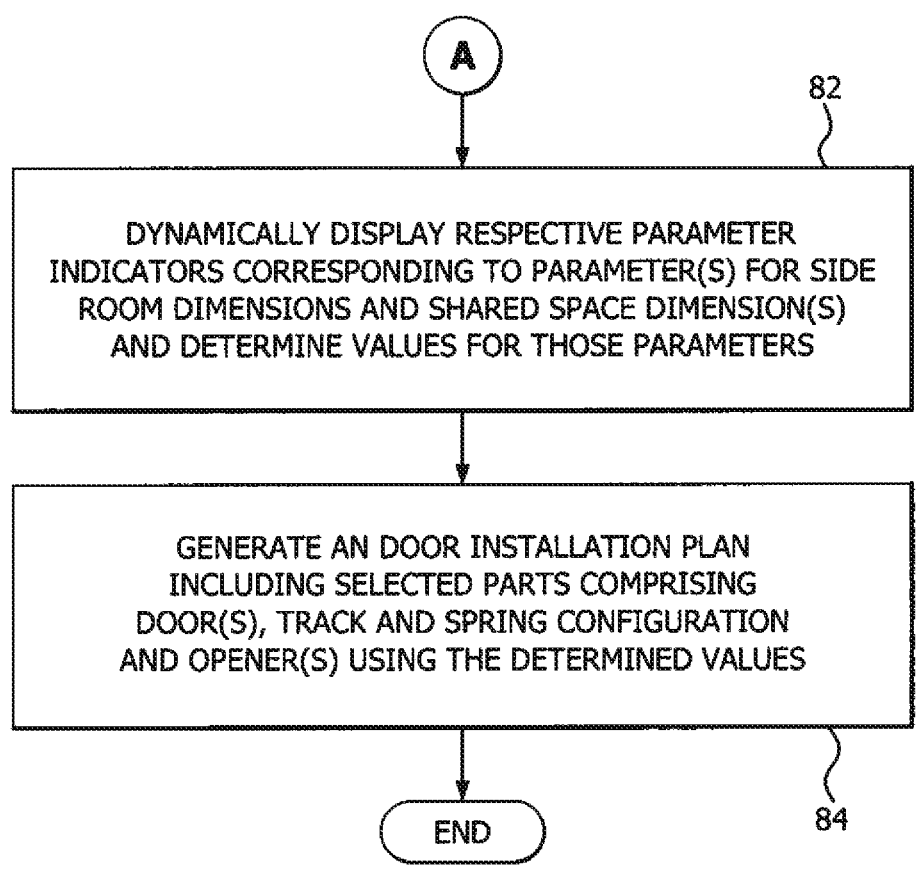
Figure 13:
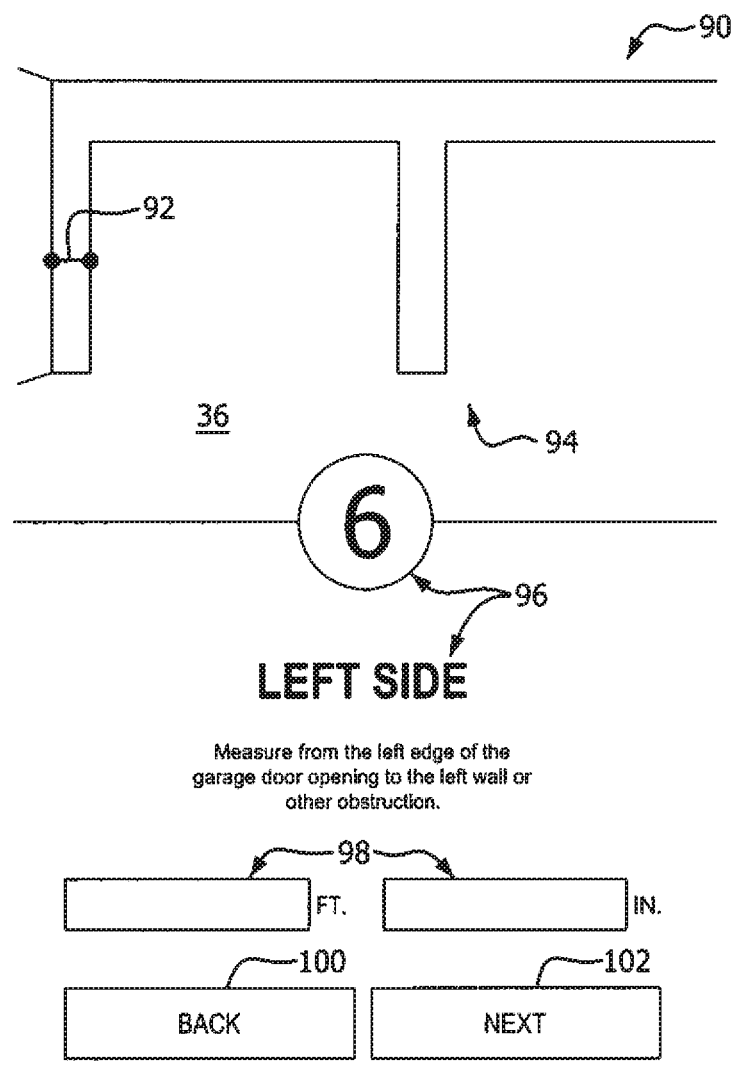
Figure 14:
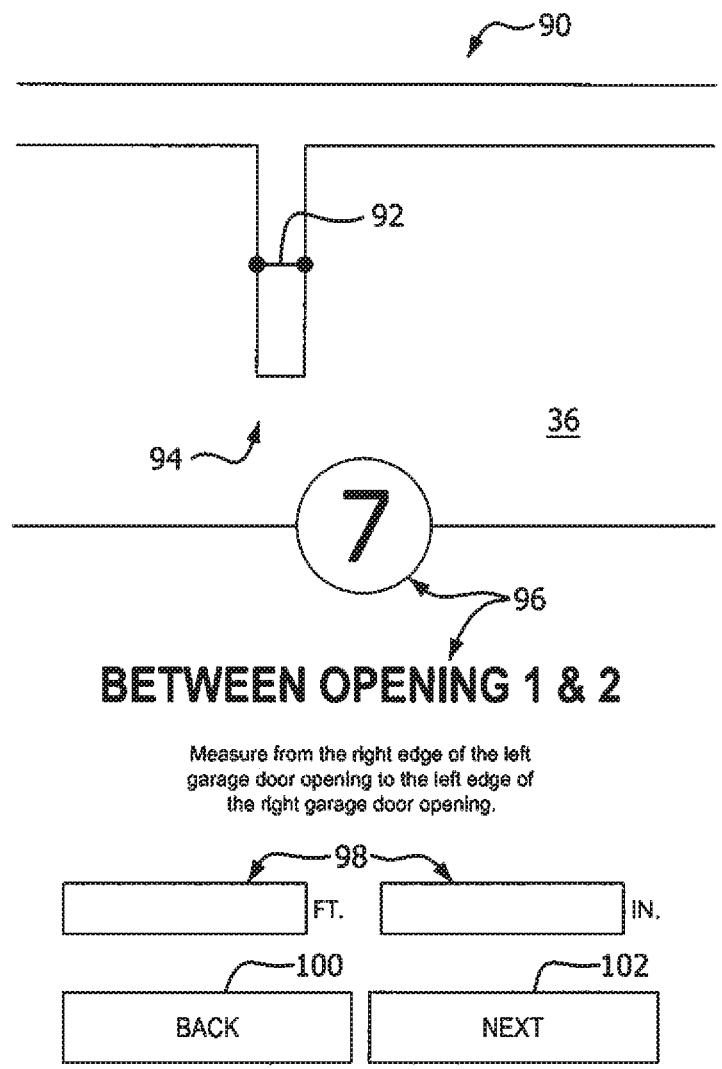
Figure 15:
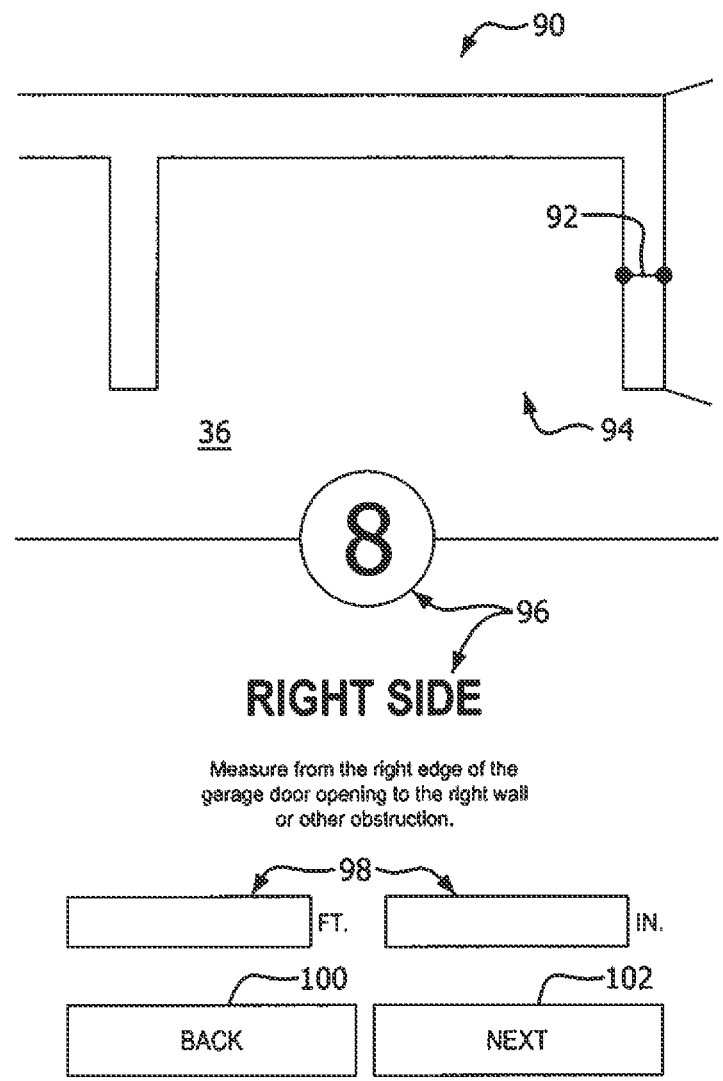

With reference to block 82 in FIG. 5B, the algorithm generates screens 90 as shown in FIGS. 13, 14 and 15 on the display 54 that are respectively a left side room screen, shared room between openings screen, a right side room screen for an example double door GD installation type. A left side room parameter in GD installations corresponds to a dimension measured from a left edge of a first (left) door 10a opening to a left wall or obstruction in the GD installation environment 36. A shared room parameter in GD installations corresponds to a dimension measured from a right edge of the first (left) door 10a opening to the left edge of the second (right) door 10b opening. A right side room parameter in GD installations corresponds to a dimension measured from a right edge of the second (right) door 10b opening to a right wall or obstruction in the GD installation environment 36. The side room parameter and shared room between adjacent openings parameter width parameter are important to ensure that tracks 20 and related hardware for the door(s) 10 is accurately selected to fit in the GD environment 36 and also accurately priced. The algorithm generates the side room and share room screens (i.e, screens 90 depicted in FIGS. 13, 14 and 15) sequentially. After determination of a value for a side room parameter and a user input, the algorithm can generate another side room or shared room. The number and sequence of side room or shared room screens 90 changes depending on the GD installation type (e.g., one, two, or three doors 10) selected by the user. Also, the depicted GD environment 36 changes, as illustrated by the differences in the two door GD environment 36 depicted in FIGS. 13-15 as compared with a one door GD environment 36 depicted in the side room screens of FIGS. 27-28 and the three door GD environment 36 in the side room screens of FIGS. 29-32. FIGS. 29-32 depict example side room and share room screens that are generated by the algorithm for a three door GD installation type instead of the screens 90 in FIGS. 13-15 for a two door GD installation type or the screens in FIGS. 27-28 for a single door GD installation type.

As illustrated in the respective screens 90 depicted in FIGS. 10 through 15, the parameter indicator 92 corresponding to a particular installation parameter can be generated in each screen 90 in a different region 94 of the GD installation environment 36 to more clearly demonstrate physical representations of the different parameter installations used for the selected GD installation type. For example, the regions 94 of the GD environment shown in FIGS. 11 and 12 differ to more clearly depict the parameter indicators 92 for the respective left opening width (FIG. 11) and the right opening width (FIG. 12). Similarly, different regions 94 of the GD environment are shown in FIGS. 13, 14 and 15 to more clearly depict the parameter indicators 92 corresponding to the respective installation parameters for left side room, shared room between openings screen, and right side room. Further, the device 60 can be configured to depict partial and enlarged selected regions 94 such as those shown in the screens 90 of FIGS. 13-15 as compared, for example, with the regions 94 depicted in screens 90 of FIGS. 11-12. The different respective parameter indicators 92 generated in the screens 90 for different installation parameters assists a user in determining what installation parameter values are needed for their selected GD installation type. The different regions 94 with parameter indicators 92 depicted in the respective screens 90 also provides a clear indication of the physical dimension representation of these installation parameters in an illustrated GD installation environment 36 for improving accuracy and completeness in procuring the parameter values needed for a GD installation design. Accordingly, improved user comprehension of the installation parameters and greater accuracy in procurement of values for those installation parameters is achieved by the illustrative embodiments described herein.

Figure 16:
Figure 18:
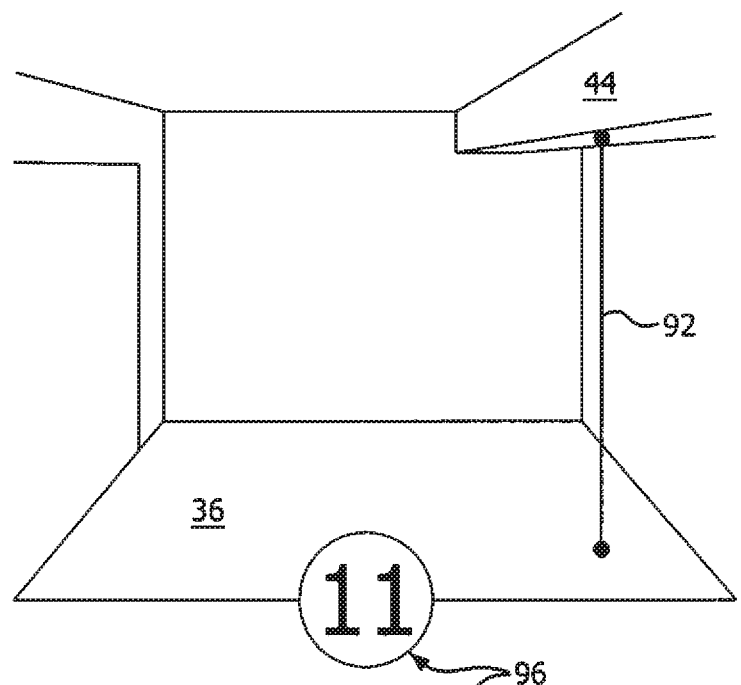

Additional screens 90 can be generated by the algorithm such as an obstruction confirmation screen as shown in FIG. 16. If a user inputs a confirmation of an obstruction, the algorithm generates screens 90 as shown in FIGS. 17 and 18 corresponding respectively to a ceiling space to obstruction parameter and an obstruction to floor parameter to provide a visual aid to a user to obtain complete and accurate values for these parameters.

Figure 22:
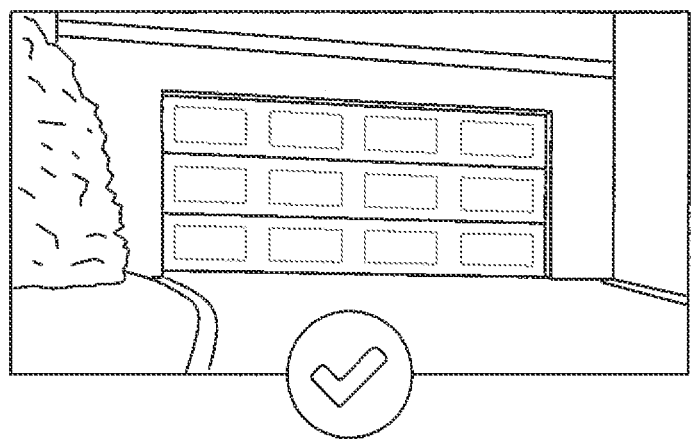
Figure 23:
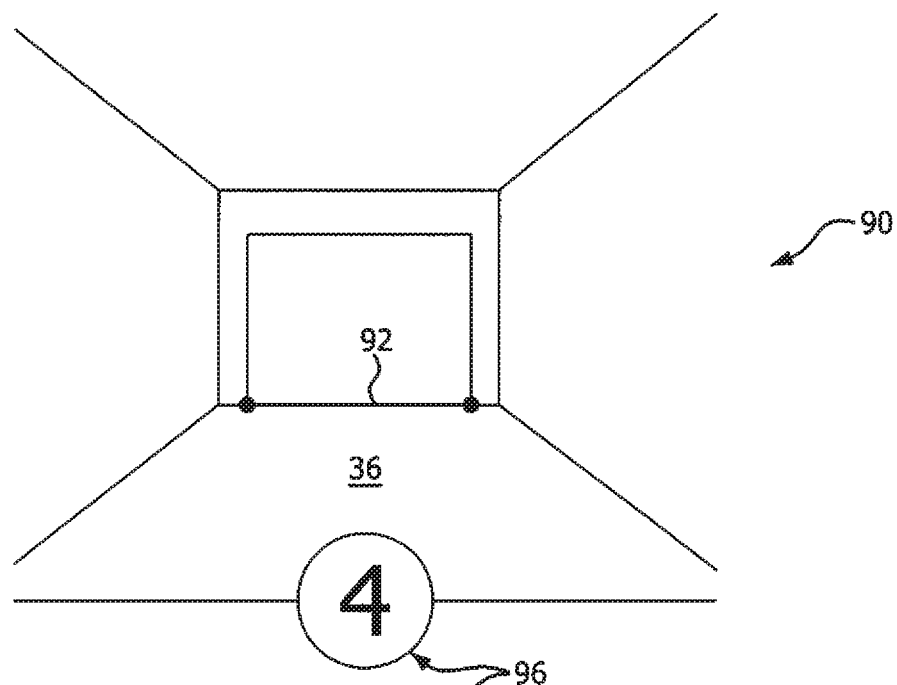

The algorithm can optionally generate a photograph screen as shown in FIG. 19 and additional questions screen as shown in FIG. 20. The values for the combination of parameters corresponding to the GD installation type selected by the user can optionally be displayed together as shown in the screen 90 depicted in FIG. 21, or can be transmitted to another connected device as they are inputted into prior screens. The algorithm can also generate an optional screen as depicted in FIG. 22 that provides a user with confirmation that all of the necessary values have been submitted for each of the combination of parameters corresponding to the GD installation type selected by the user.

With reference to block 84 in FIG. 5B, a GD installation design can be generated using the complete and accurate inputted values for the combination of parameters with which to select door(s) 10, tracks 20, opener(s) 22, spring(s) 28/28' and supporting hardware and brackets for the selected GD installation type and corresponding parameters specific to the actual site of GD installation. The design of the display screens described and illustrated in accordance with example embodiments improves completeness and accuracy of values procured for installation parameters needed for a GD installation, obviating GD designs with ill-fitting parts and thereby decreasing repeat visits to a site to take additional and/or more accurate measurements. In addition to professional installers, the tool is useful to buyers who can procure the parameter values without the inconvenience of having to schedule a time to be at home to meet with a professional installer, who in the past would have needed to be present to obtain parameter values necessary for a GD installation design. As stated above, the animated and dynamic operation of the parameter indicators 92 in corresponding and sequential screens that are specific to a selected GD installation type enables professional GD installers and unskilled users alike to accurately and completely measure and otherwise procure values for all needed installation parameters in one session. The particular manner of presenting information in electronic device displays according to the illustrative embodiments improves correlation between measured values and parameters used in a GD installation.

In accordance with another illustrative embodiment, the device 60 can be a mobile phone with measuring app that cooperates with the algorithm generating the GUI screens 90 and installation parameter indicators 92. For example, the device 60 can be an iPhone with iOS 12 and a Measure app that employs augmented reality (AR) kit. For example, the algorithm generates a screen with indicators separate from a camera view with point and arrow commands generated by Measure app, or indicators 92 overlaid in the camera view, to demarcate start and stop points in the camera image to generate a measurement of the viewed object and its measured dimension that corresponds to a particular installation parameter. A user can therefore select a start point, point his phone at the end point of a particular installation parameter and automeasure the dimension (e.g., ceiling to obstruction parameter) or automeasure a rectangular object such as GD opening width and height. Similar apps for Android mobile devices can also be used to measure dimensions of physical objects using an Augmented Reality (AR) ruler. In addition, a user can tap on a measurement and copy it to another screen (e.g, e.g., FIG. 17 or 21 generated by the GD installation tool).

It will be understood by one skilled in the art that this disclosure is not limited in its application to the details of construction and the arrangement of components set forth in the following description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments of the present invention can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing illustrative embodiments of the present invention can be easily construed as within the scope of the invention by programmers skilled in the art to which the present invention pertains. Method steps associated with the illustrative embodiments of the present invention can be performed by one or more programmable processors executing a computer program, code or instructions to perform functions (e.g., by operating on input data and/or generating an output). Method steps can also be performed by, and apparatus of the illustrative embodiments of the invention can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

The above-presented description and figures are intended by way of example only and are not intended to limit the present invention in any way except as set forth in the following claims. It is particularly noted that persons skilled in the art can readily combine the various technical aspects of the various elements of the various illustrative embodiments that have been described above in numerous other ways, all of which are considered to be within the scope of the invention.

The invention claimed is:

1. A method for displaying parameters on a graphical user interface for improved garage door installation design, the method comprising:

in response to selection of a garage door (GD) installation type, generate on a display device a graphical user interface (GUI) screen depicting at least one portion of a GD installation environment corresponding to the selected GD installation type, the GD installation environment being selected from a group of different GD installation environments that each have different numbers of GD openings and different combination of installation parameters corresponding to different GD opening dimensions, different head room dimensions and different side room dimensions associated with each GD opening in that GD installation environment;

dynamically generate a parameter indicator in a selected region in at least one portion of the GD installation environment that corresponds to a parameter from among the combination of installation parameters associated with the selected GD installation type and determine a value for the parameter;

in response to a user input, dynamically generate another parameter indicator in a selected region in at least one portion of the GD installation environment that corresponds to another parameter from among the combination of installation parameters associated with the selected GD installation type and determine a value for the other parameter;

in response to respective additional user inputs, dynamically generate respective additional parameter indicators in respective selected regions in at least one portion of the GD installation environment that correspond to remaining parameters among the combination of installation parameters associated with the selected GD installation type and determine respective values for the remaining parameters; and generating a GD installation design including selected parts comprising one or more garage doors, a track and spring configuration and an opener using the values determined for the combination of installation parameters associated with the selected GD installation type, the selected parts being selected from the group consisting of different garage doors having respective GD opening dimensions, different types of track and spring configurations having respective head room dimension requirements and side room dimension requirements and different types of openers having respective head room dimension requirements.

2. The method of claim 1, wherein the parameter corresponds to a head room dimension, the other parameter corresponds to an opening height of one or more GD openings, and the remaining parameters correspond, respectively, to an opening width of the GD, and side room dimensions corresponding to at least one of an amount of space on each side of an opening and an amount of space between adjacent openings.

3. The method of claim 1, further comprising generate a different GUI screen in response to one or more of the user input and the additional user inputs, the different GUI screen comprising an enlarged view of at least one of the selected region and the at least one portion of a GD installation environment.

4. The method of claim 1, further comprising generate respective GUI screens in response to each of the user input and the additional user inputs, each of the respective GUI screens comprising the corresponding parameter indicator and alphanumerical characters providing at least one of a description corresponding to the parameter indicator and a sequence indication.

5. The method of claim 1, wherein generate the parameter indicator comprises generate a starting point, and generate a dynamically extending line from the starting point to an ending point, wherein the starting point, dynamically extending line and ending point are displayed to define a corresponding one of the different GD opening dimensions, different head room dimensions, and different side room dimensions in the GD installation environment of the selected GD installation type.

6. The method of claim 2, wherein the selected GD installation type comprises at least a first GD opening and a second GD opening, and to dynamically generate the respective additional parameter indicators further comprises:
generate a graphical user interface (GUI) screen depicting at least one portion of the GD installation environment indicating the first GD opening, the second GD opening, a shared space dimension between the first GD opening and the second GD opening, a first side room dimension on the side of the first GD opening opposite the shared space dimension, and a second side room dimension on a side of the second GD opening opposite the shared spaced dimension;
dynamically generate a first side room parameter indicator and determine a value corresponding to a first side room dimension;
in response to a user input, dynamically generate a shared space parameter indicator and determine a value corresponding to a shared space dimension; and
in response to a user input, dynamically generate a second side room parameter indicator and determine a value corresponding to a second side room dimension.

7. The method of claim 2, wherein the selected GD installation type comprises at least a first GD opening and a second GD opening, and to dynamically generate the respective additional parameter indicators further comprises:
generate a graphical user interface (GUI) screen depicting at least one portion of the GD installation environment indicating the first GD opening, and the second GD opening;
dynamically generate a first GD opening parameter indicator that corresponds to a width of the first GD opening and determine a value for the first GD opening parameter; and
in response to a user input, dynamically generate a second GD opening parameter indicator that corresponds to a width of the second GD opening and determine a value for the second GD opening parameter.

8. The method of claim 1, wherein the GD installation environment has an obstruction and further comprising:
generate a prompt on a GUI screen requesting confirmation from a user regarding presence of an obstruction in the GD installation environment; and
in response to a user input representing confirmation, generate a graphical user interface (GUI) screen depicting at least one portion of the GD installation environment indicating the obstruction and dynamically generate a GD opening parameter indicator that corresponds to at least one of a dimension extending in a horizontal plane from a wall in the GD installation environment to the obstruction, and a dimension extending in a vertical plane from a floor in the GD installation environment to the obstruction.

9. A device for displaying parameters for improved garage door installation design, the device comprising:
a display comprising a graphical user interface (GUI);
a processor, communicatively coupled to the display, and configured to execute a program module;
a memory, communicatively coupled to the processor, configured to store the program module, wherein the program module includes instructions to:
in response to selection of a garage door (GD) installation type, generate on the display a GUI screen depicting at least one portion of a GD installation environment corresponding to the selected GD installation type, the GD installation environment being selected from a group of different GD installation environments that each have different numbers of GD openings and different combination of installation parameters corresponding to different GD opening dimensions, different head room dimensions and different side room dimensions associated with each GD opening in that GD installation environment;
dynamically generate a parameter indicator in a selected region in at least one portion of the GD installation environment that corresponds to a parameter from among the combination of installation parameters associated with the selected GD installation type and determine a value for the parameter;
in response to a user input, dynamically generate another parameter indicator in a selected region in at least one portion of the GD installation environment that corresponds to another parameter from among the combination of installation parameters associated with the selected GD installation type and determine a value for the other parameter;
in response to respective additional user inputs, dynamically generate respective additional parameter indicators in respective selected regions in at least one portion of the GD installation environment that correspond to remaining parameters among the combination of installation parameters associated with the selected GD installation type and determine respective values for the remaining parameters; and
generate a GD installation design including selected parts comprising one or more garage doors, a track and spring configuration and an opener using the values determined for the combination of installation parameters associated with the selected GD installation type, the selected parts being selected from the group consisting of different garage doors having respective GD opening dimensions, different types of track and spring configurations having respective head room dimension requirements and side room dimension requirements and different types of openers having respective head room dimension requirements.

10. The device of claim 9, wherein the parameter corresponds to a head room dimension, the other parameter corresponds to an opening height of one or more GD openings, and the remaining parameters correspond, respectively, to an opening width of the GD, and side room dimensions corresponding to at least one of an amount of space on each side of an opening and an amount of space between adjacent openings.

11. The device of claim 9, wherein the program module further comprises instructions to generate a different GUI screen in response to one or more of the user input and the additional user inputs, the different GUI screen comprising an enlarged view of at least one of the selected region and the at least one portion of a GD installation environment.

12. The device of claim 9, wherein the program module further comprises instructions to generate respective GUI screens in response to each of the user input and the additional user inputs, each of the respective GUI screens comprising the corresponding parameter indicator and alphanumerical characters providing at least one of a description corresponding to the parameter indicator and a sequence indication.

13. The device of claim 9, wherein generate the parameter indicator comprises generate a starting point, and generate a dynamically extending line from the starting point to an ending point, wherein the starting point, dynamically extending line and ending point are displayed to define a corresponding one of the different GD opening dimensions, different head room dimensions, and different side room dimensions in the GD installation environment of the selected GD installation type.

14. The device of claim 10, wherein the selected GD installation type comprises at least a first GD opening and a second GD opening, and to dynamically generate the respective additional parameter indicators further comprises:
generate a graphical user interface (GUI) screen depicting at least one portion of the GD installation environment indicating the first GD opening, the second GD opening, a shared space dimension between the first GD opening and the second GD opening, a first side room dimension on the side of the first GD opening opposite the shared space dimension, and a second side room dimension on a side of the second GD opening opposite the shared spaced dimension;
dynamically generate a first side room parameter indicator and determine a value corresponding to a first side room dimension;
in response to a user input, dynamically generate a shared space parameter indicator and determine a value corresponding to a shared space dimension; and
in response to a user input, dynamically generate a second side room parameter indicator and determine a value corresponding to a second side room dimension.

15. The device of claim 10, wherein the selected GD installation type comprises at least a first GD opening and a second GD opening, and to dynamically generate the respective additional parameter indicators further comprises:
generate a graphical user interface (GUI) screen depicting at least one portion of the GD installation environment indicating the first GD opening, and the second GD opening;
dynamically generate a first GD opening parameter indicator that corresponds to a width of the first GD opening and determine a value for the first GD opening parameter; and
in response to a user input, dynamically generate a second GD opening parameter indicator that corresponds to a width of the second GD opening and determine a value for the second GD opening parameter.

16. The device of claim 9, wherein the GD installation environment has an obstruction and the program module includes instructions to:
generate a prompt on a GUI screen requesting confirmation from a user regarding presence of an obstruction in the GD installation environment; and
in response to a user input representing confirmation, generate a graphical user interface (GUI) screen depicting at least one portion of the GD installation environment indicating the obstruction and dynamically generate a GD opening parameter indicator that corresponds to at least one of a dimension extending in a horizontal plane from a wall in the GD installation environment to the obstruction, and a dimension extending in a vertical plane from a floor in the GD installation environment to the obstruction.

17. The device of claim 9, wherein the program module is configured to display at least one of the parameter indicators in the combination of installation parameters associated with the selected GD installation type in at least one of an image generated by camera and rendered in a measurement application, and a display screen viewed with the image.

18. The device of claim 17, wherein the device is a mobile phone running the measurement application and the measurement application has an augmented reality kit such that the mobile phone can be pointed to a start point and an end point corresponding to the at least one of the parameter indicators, and the dimension between the start point and the end point is automatically measured to determine a value for the parameter indicator.

* * * * *